United States Patent
Smith

(10) Patent No.: US 9,133,973 B2
(45) Date of Patent: Sep. 15, 2015

(54) METHOD OF USING THERMAL INSULATION PRODUCTS WITH NON-PLANAR OBJECTS

(71) Applicant: Nanopore, Inc., Albuquerque, NM (US)

(72) Inventor: Douglas M. Smith, Albuquerque, NM (US)

(73) Assignee: Nanopore, Inc., Albuquerque, NM (US)

( * ) Notice: Subject to any disclaimer, the term of this patent is extended or adjusted under 35 U.S.C. 154(b) by 0 days.

(21) Appl. No.: 14/154,760

(22) Filed: Jan. 14, 2014

(65) Prior Publication Data

US 2014/0367033 A1 Dec. 18, 2014

Related U.S. Application Data

(63) Continuation-in-part of application No. 13/741,194, filed on Jan. 14, 2013.

(60) Provisional application No. 61/799,173, filed on Mar. 15, 2013, provisional application No. 61/799,752, filed on Mar. 15, 2013, provisional application No. 61/799,590, filed on Mar. 15, 2013.

(51) Int. Cl.

| | |
|---|---|
| *F16L 59/02* | (2006.01) |
| *F16L 59/14* | (2006.01) |
| *B29C 53/04* | (2006.01) |
| *E04B 1/80* | (2006.01) |
| E04B 1/74 | (2006.01) |
| E04B 1/76 | (2006.01) |

(52) U.S. Cl.
CPC .............. *F16L 59/028* (2013.01); *B29C 53/04* (2013.01); *E04B 1/803* (2013.01); *E04B 1/806* (2013.01); *F16L 59/14* (2013.01); *E04B 2001/742* (2013.01); *E04B 2001/7691* (2013.01); *Y10T 156/103* (2015.01); *Y10T 156/1028* (2015.01); *Y10T 156/1033* (2015.01)

(58) Field of Classification Search
None
See application file for complete search history.

(56) References Cited

U.S. PATENT DOCUMENTS 3,812,886 A * 5/1974 Hallwood ...................... 138/149
5,575,871 A * 11/1996 Ryoshi et al. .................. 156/78

FOREIGN PATENT DOCUMENTS

GB 865391 7/1957

* cited by examiner

*Primary Examiner* — Barbara J Musser
(74) *Attorney, Agent, or Firm* — Marsh Fischmann & Breyfogle LLP

(57) ABSTRACT

High-efficiency thermal insulation products and methods for use thereof for insulating cylindrically-shaped and other non-planar objects such as pipes, tanks, and the like. One method includes heating a substantially gas-tight enclosure to render the gas-tight enclosure pliable, wrapping the inner surface of the gas-tight enclosure about at least a portion of a non-planar surface, and cooling the gas-tight enclosure to render the gas-tight enclosure substantially unpliable about the non-planar surface. The gas-tight enclosure may include a sealed interior portion having a pressure that is not greater than about 500 mbar at a temperature of about 20° C. before the heating step and/or after the cooling step. A ratio of a thickness of the gas-tight enclosure to a radius of curvature of the portion of the non-planar surface may be at least about 1 to 8.

27 Claims, 12 Drawing Sheets

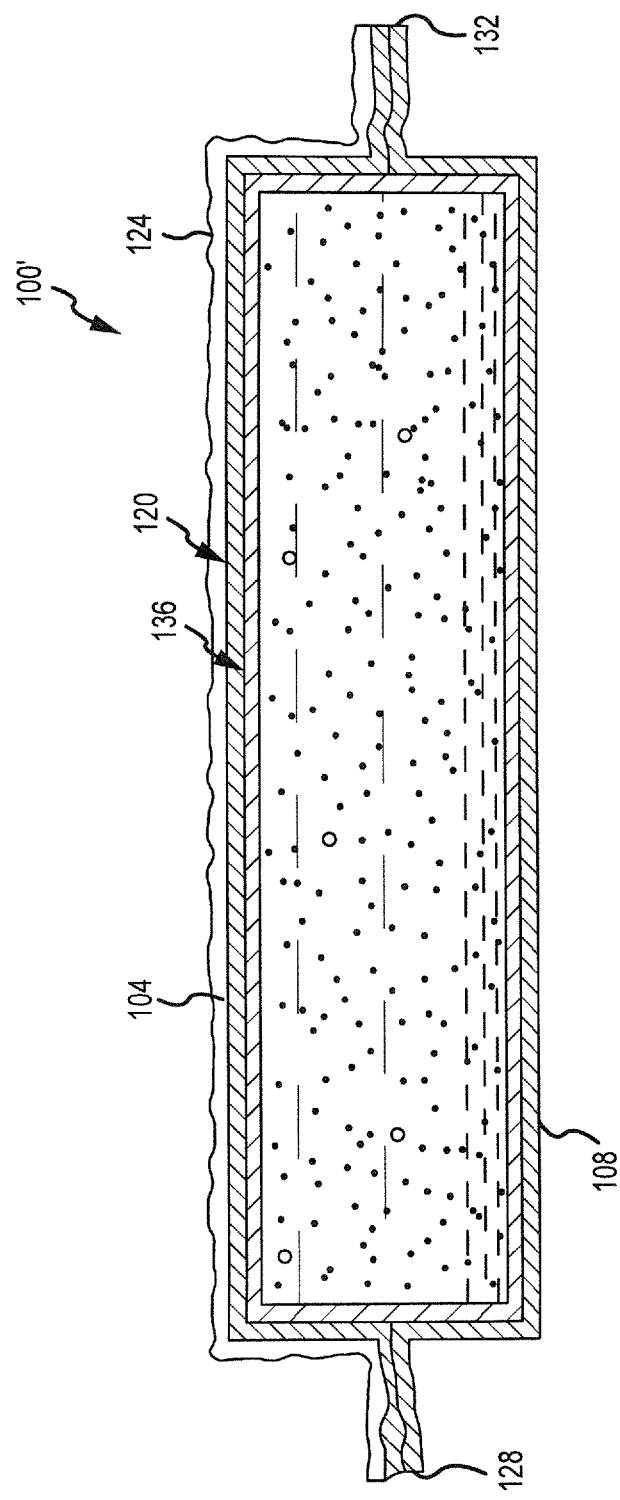

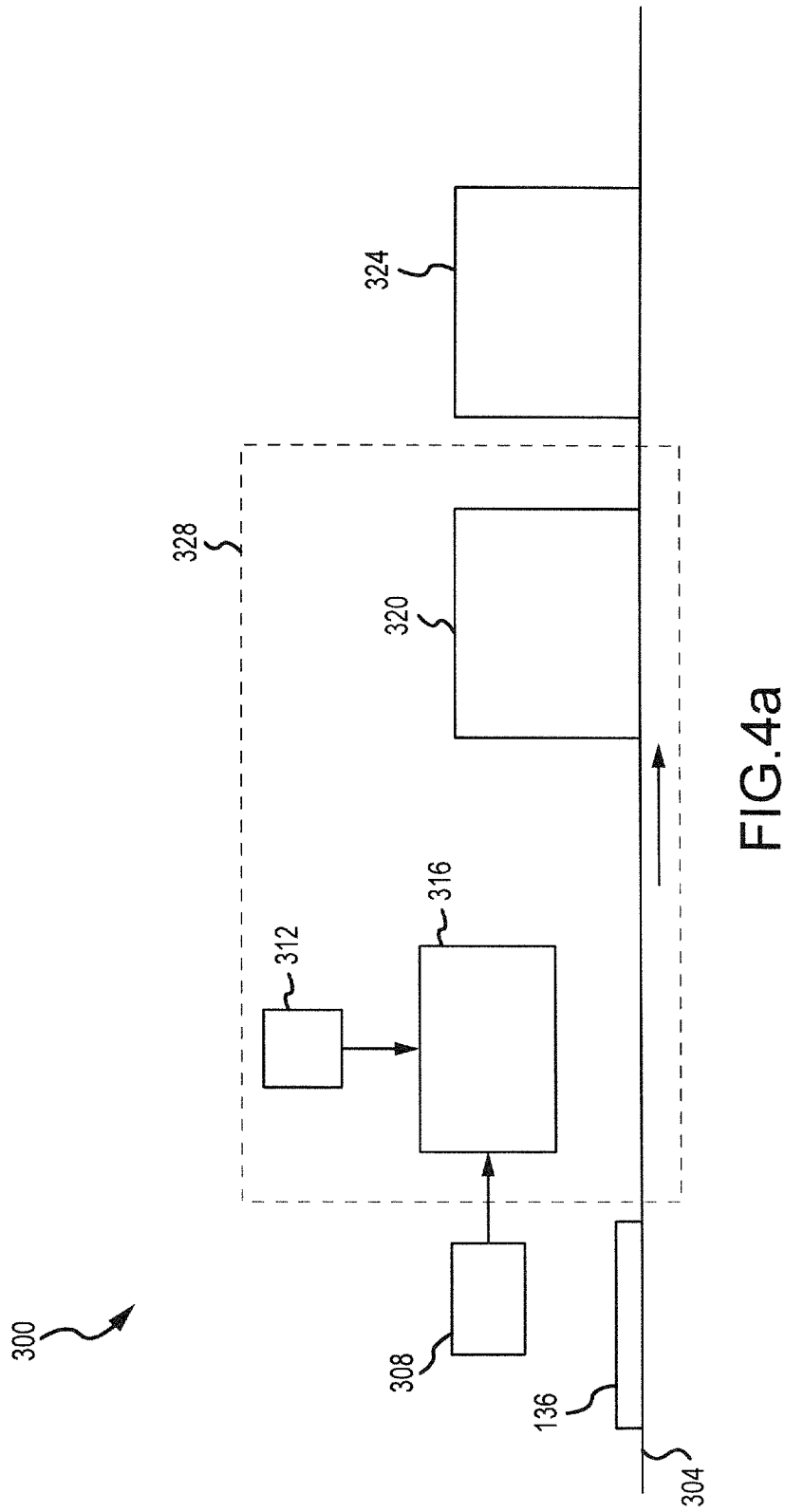

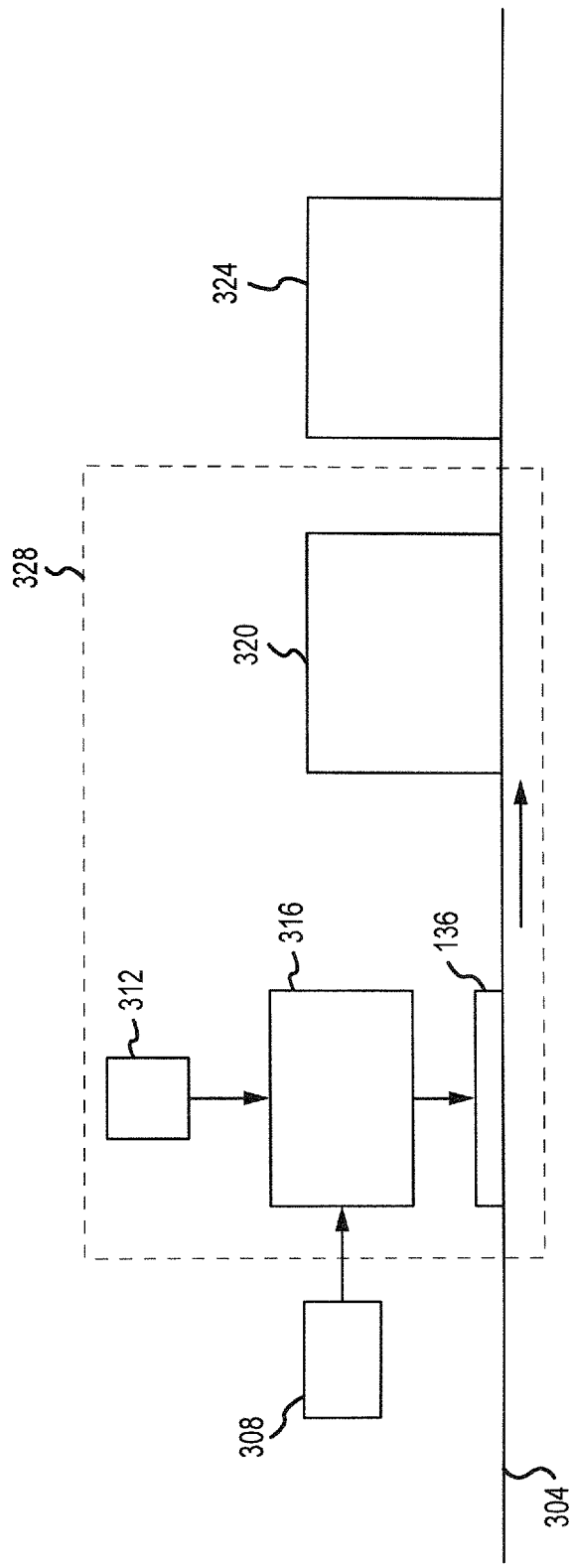

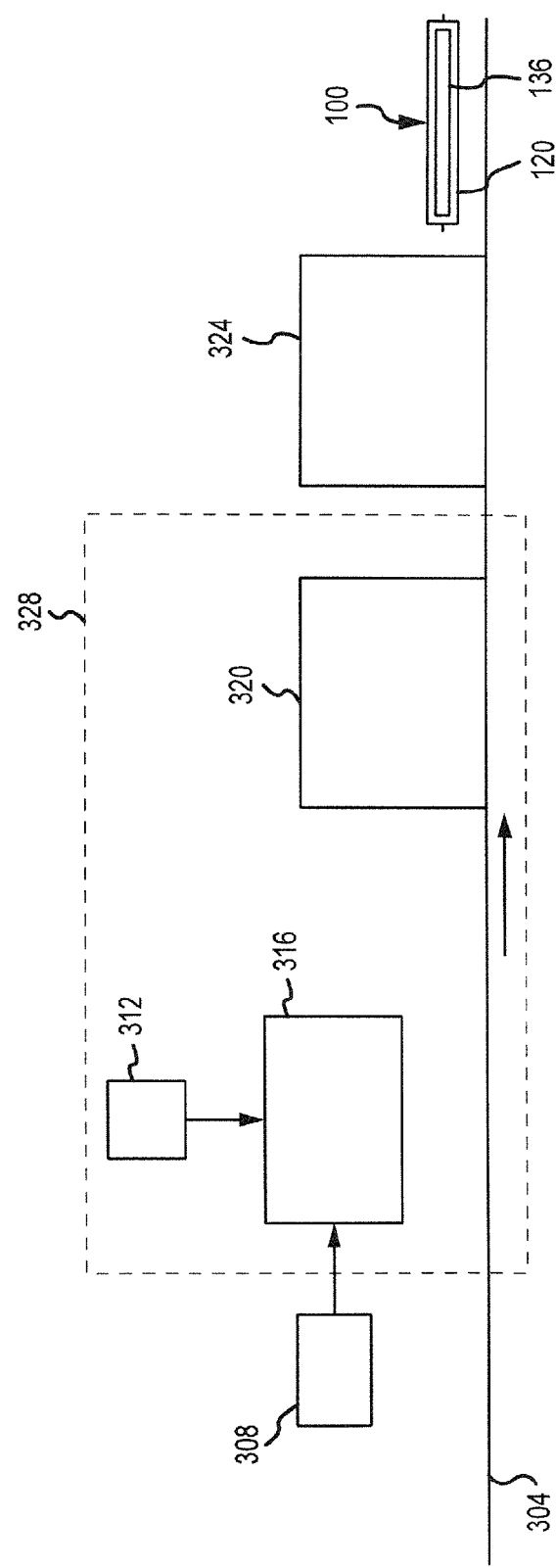

METHOD OF USING THERMAL INSULATION PRODUCTS WITH NON-PLANAR OBJECTS

CROSS-REFERENCE TO RELATED APPLICATIONS

This application is a continuation-in-part of U.S. Ser. No. 13/741,194, entitled "Production of Thermal Insulation Products," and filed on Jan. 14, 2013. This application also claims priority from U.S. Ser. No. 61/799,173, entitled "Thermal Insulation Products for Use with Non-Planar Objects," filed on Mar. 15, 2013; U.S. Ser. No. 61/799,752, entitled "Thermal Insulation Products and Production of Thermal Insulation Products," filed on Mar. 15, 2013; and U.S. Ser. No. 61/799,590, entitled "Thermal Insulation Products for Insulating Buildings and Other Enclosed Environments," filed on Mar. 15, 2013. All the contents of the aforementioned applications are incorporated herein in their entirety as if set forth in full.

This application incorporates by reference the following non-provisional patent applications which are concurrently filed on Jan. 14, 2014 with the present application: U.S. Non-Provisional Patent Application entitled "Thermal Insulation Products and Production of Thermal Insulation Products," inventor Douglas M. Smith, identified by Ser. No. 14/154,704; and U.S. Non-Provisional Patent Application entitled "Thermal Insulation Products for Insulating Buildings and Other Enclosed Environments," inventor Douglas M. Smith, identified by Ser. No. 14/154,806. All the contents of the aforementioned applications are incorporated herein in their entirety as if set forth in full.

BACKGROUND

1. Field of the Invention

The present invention generally relates to high-efficiency insulation products (e.g., panels) and, more particularly, to high-efficiency insulation products that may be applied about cylindrically-shaped or other non-planar objects (e.g., pipes, tanks, etc.) to limit heat transfer into and out of the non-planar objects.

2. Relevant Background

Thermal insulation generally refers to a porous material with an inherently low thermal conductivity serving to protect the system of interest from heat flow into or out of its surroundings. The use of thermal insulation is prevalent in society ranging from use in domestic refrigerators (e.g., for reduced energy consumption or additional internal volume), in shipping containers containing ice or dry ice used for drugs or food (e.g., to extend the lifetime of the shipment), in the tiles on the space shuttle (e.g., used to protect the shuttle from the heat of reentry into the atmosphere), and/or the like. Most thermal insulation products used today are either fibrous materials, such as fiberglass, mineral wool and asbestos, or polymer foams, such as expanded polystyrene, polyurethane, foamed polyethylene and foamed polypropylene. Use of fibrous materials may be undesirable in many instances due to problems related to health and safety. Use of polymer foams may be undesirable due to their flammability, lack of recyclability and release of environmentally unfriendly gases, such as fluorocarbons or hydrocarbons during manufacture. In addition, the thermal performance of both fibrous materials and polymer foam materials are on the same order as or greater than stagnant air (e.g., about 0.026 W/mK at ambient temperature). Because of increased concern with respect to energy efficiency and the environment, there has been much interest in the development of new classes of thermal insulation that have a thermal conductivity much less than that of air, such as aerogels, inert gas-filled panels and vacuum insulation panels.

For thermal insulation, a key measure of performance is the thermal conductivity of the material. More specifically, lower thermal conductivity means lower heat flow through the insulation for a given temperature difference. In the absence of convection, heat transfer through insulation occurs due to the sum of three components: solid phase conduction, gas phase conduction and radiation. Solid phase conduction may be minimized by using a low density material (e.g., a material comprising a high volume fraction of pores). Most insulation is between, for instance, 80 and 98% porous. It is also advantageous to use a solid material that has a low inherent thermal conductivity (e.g., plastics and some ceramics/glasses are better than metals).

The relative importance of radiation depends upon the temperature range of interest and becomes a more prevalent component as the temperature is increased above ambient and/or the magnitude of the other heat transfer modes is minimized. Materials with high infrared (IR) extinction coefficients due to absorption (e.g., IR opacifiers such as carbon black, iron oxide, etc.) or scattering (e.g., titania) are often added to high performance insulation to limit radiative heat transfer.

With control of radiation, suppression of free convection, use of low thermal conductivity materials and a highly porous solid matrix, the thermal conductivity of the insulation approaches that of the gas contained within the pores of the insulation. There are a number of methods for lowering gas phase conduction in insulation. One method to do so is to trap gases in the pores that have lower thermal conductivity than that of air, such as argon, carbon dioxide, xenon and krypton. Depending upon the gas employed, the thermal conductivity of insulation filled with an inert gas can range from, for instance, 0.009 to 0.018 W/mK. However, the insulation must be packaged such that the filler gas does not leak from the pores and also so that atmospheric gases (e.g., nitrogen, oxygen) do not penetrate the insulation.

Another method for controlling or lowering gas phase conduction is to employ the Knudsen effect. Generally, gas phase conductivity within the insulation may be dramatically reduced when the mean free path of the gas approaches the pore size of the insulation. In fact, gas phase conductivity may approach zero (so that the total effective thermal conductivity is the sum of only radiation and solid phase conduction) when the mean free path of the gas is much larger than the pore size. For instance, the mean free paths of the components of air are approximately 60 nanometers at ambient temperature and pressure, while the pore/cell size of polymer foams and fibrous materials is typically greater than 10 microns.

There are at least two approaches that can employ the Knudsen effect to lower gas phase conduction. A first approach is to encapsulate the insulation within a barrier material and partially evacuate the gas in the insulation (i.e., use a vacuum pump to evacuate the insulative material). This increases the mean free path of the gas by lowering the gas density, which lowers gas phase conduction. Materials employing such gas evacuation techniques can achieve a thermal conductivity of less than 0.002 W/mK at ambient temperatures, which is an order of magnitude improvement over conventional insulation.

The advantages of utilizing a vacuum with an insulative material have been known for many years and are the basis of vacuum Dewars that are used with cryogenic liquids and for storing hot or cold beverages or other products. For example, U.S. Pat. No. 1,071,817 by Stanley discloses a vacuum bottle or Dewar, where a jar is sealed inside another jar with a deep vacuum maintained in the annular space with the two jars being joined at the jar mouth. Such an approach minimizes joining and thermal bridging problems, but most insulation applications require many different shapes that cannot be met by a Dewar.

Another approach is to use a material with very small pores and low density. One such class of materials is nanoporous silica, also known as silica aerogels, which generally have small pores (e.g., <100 nm), a low density, and exhibit a total thermal conductivity at ambient pressure that is lower than that of the gas contained within the pores. It is known to use nanoporous silica in conjunction with a vacuum to create a vacuum insulation panel (VIP). U.S. Pat. No. 4,159,359 by Pelloux-Gervais discloses the use of compacted silica powders, such as precipitated, fumed, pyrogenic, or aerogels, contained in plastic barriers, which are subsequently evacuated and then sealed.

SUMMARY

It is often desirable to limit heat transfer into or out of a system of interest having non-planar or curved outer walls rather than necessarily planar outer surfaces. More specifically, VIPs can sometimes be applied around curved surfaces such as pipes, cylindrical tanks, and the like to limit heat flow through the outer walls and maintain a desired operating temperature range within the outer walls. For instance, sleeve-like insulators are sometimes applied about cryogenic pipelines and become evacuated (e.g., due to condensing of $CO_2$ contained within the insulators) when exposed to cryogenic temperatures (e.g., cyropumping). However, these types of sleeve-like insulators are typically only configured for use with a particular diameter of pipe and often must be applied to the pipe before installation of the pipe into the particular system of interest. Furthermore, these insulators are ineffective unless the fluid temperature contained within the pipelines is low enough to condense or cause direct solid-vapor deposition of the $CO_2$ or other fluid contained within the sleeve to evacuate the inside of the sleeve.

While VIPs can sometimes be formed into non-planar shapes during manufacture, the VIPs are then set in the particular non-planar shape throughout their lifespan and are thus only configurable to a particular shape and/or contour of a surface to be insulated. As a still further example, some VIPs can be bent around curved surfaces in an attempt to limit heat transfer through the curved surface. However, bending a VIP about a curved surface (e.g., especially those surfaces of reduced radii of curvature or bending radii) can result in crimping of one of the barrier walls of the VIP into the other thereby forming a "cold short" where the walls contact each other; in other situations, bending a VIP can even result in rupture of the VIP due to the inelastic nature of the barrier materials. To limit the likelihood of rupture when bending a VIP around a curved surface, the VIP is often required to be of minimal thickness which necessarily limits its thermal performance.

In view of the foregoing, the present invention is directed to high-efficiency insulation products (e.g., panels, sections, etc., of any appropriate shape and dimensions) and systems, methods of manufacture thereof, methods of use thereof for insulating cylindrically-shaped or other non-planar walls (e.g., pipes, tanks, etc.) to limit heat transfer into and out of the non-planar walls. As will be discussed herein, the disclosed utilities (e.g., products, apparatuses, systems, methods, processes, etc.) allow for significant increases in thermal performance, increases in the range of operating conditions in which the disclosed utilities can be utilized (e.g., in relation to the types of curved surfaces, operating temperatures of the systems of interest, etc.), reductions in costs (e.g., electricity costs), and the like, in relation to current products and methods for insulating non-planar surfaces.

In one arrangement, the disclosed thermal insulation products can be evacuated free of the use of mechanical vacuum pumps thus allowing for processing and sealing (e.g., encapsulation) to occur at ambient pressures. Eliminating or at least limiting the use of energy-intensive vacuum pumps to evacuate the disclosed products allows for the elimination or at least reduction in the volume or amount of at least some of the components making up the nanoporous core (e.g., such as the fibers typically present in current VIPs to maintain the structural integrity of the VIPs during the mechanical evacuation process), panel shrinkage during such mechanical evacuation thus allowing for improved (e.g., less variable) panel dimensions, reduced energy consumption, reduced overall process steps, reduced capital investment, and the like. As will also be discussed below, the present thermal insulation product production processes at least substantially eliminate the need for drying of the core material (e.g., nanoporous silica) before sealing of the same within the outer gas-impermeable barrier or envelope which also reduces energy consumption, overall process steps, capital investment, product variability, and the like.

For purposes of this disclosure, "ambient" refers to the conditions (e.g., temperature and/or pressure) of the general environment within which the thermal insulation products according to the embodiments disclosed herein are produced. For instance, at about sea level, the production of the thermal insulation products disclosed herein would occur at an ambient pressure of about 1013 mbar, while at an elevated location such as Albuquerque, N. Mex. (e.g., elevation of about 5355'), the production would occur at an ambient pressure of about 800 mbar. Furthermore, the ambient temperature will be assumed to be a normal inside air temperature (e.g., between about 12-38° C., such as about 21° C.) where the disclosed thermal insulation products are produced.

In one aspect, a system includes a cylindrical wall (e.g., pipe, tank) having an outside surface and a thermal insulation product disposed about the cylindrical wall. The thermal insulation product includes a substantially gas-impermeable envelope (e.g., gas-tight enclosure such as a metallic and/or polymeric film) having inner and outer opposing surfaces and a thickness between the inner and outer opposing surfaces, a sealed interior portion within the gas-impermeable envelope between the inner and outer opposing surfaces and having a pressure of not greater than about 500 mbar at a temperature of at least about 20° C., and a support material (e.g., a nanoporous core) including a particulate blend (e.g., a fine powder such as silica powder, aerogel powder, etc.) within the interior portion. The inner surface of the gas-impermeable envelope abuts (e.g., adjacent, directly contacts, etc.) the outside surface of the cylindrical wall along at least a portion of (e.g., some, most or a substantial entirety of) a circumference of the cylindrical wall. Furthermore, a ratio of the thickness of the substantially gas-impermeable envelope to an outer radius of the portion of the cylindrical wall is at least about 1 to 8.

For instance, the ratio of the thickness of the substantially gas-impermeable envelope to the outer radius of the portion of the cylindrical wall may be at least about 1 to 4, such as at least about 1 to 2. As another example, the thickness of the gas-impermeable envelope may be at least about 2 mm, such as at least about 10 mm, or at least about 20 mm. As another example, the thickness of the gas-impermeable envelope may be not greater than about 100 mm, such as not greater than about 80 mm, or not greater than about 60 mm. As a still further example, the radius of curvature may be at least about 3 mm, such as at least about 6 mm, or at least about 10 mm. In one variation, an inner surface of a second thermal insulation product (e.g., elastomeric foam, fiberglass, etc.) may be disposed about the first thermal insulation product so as to abut the outer surface of the first thermal insulation product. In another variation, the pressure within the gas-impermeable envelope may be not greater than about 250 mbar at a temperature of at least about 20° C., such as not greater than about 100 mbar, or not greater than about 20 mbar, or not greater than about 5 mbar.

In some arrangements, the thermal insulation product may be manufactured into a desired non-planar shape (e.g., so that the inner surface of the thermal insulation product comprises a curvature or contour generally matching that of an outer surface of a non-planar or cylindrical surface). For instance, a substantially gas-tight enclosure having first and second opposing surfaces and a thickness between the first and second opposing surfaces may have a sealed interior portion within the gas-tight enclosure between the first and second opposing surfaces having a pressure not greater than about 500 mbar at a temperature of at least about 20° C. and a support material therewithin, where a ratio of the thickness to a radius of curvature of the first surface is at least about 1 to 8, such as at least about 1 to 4.

In other arrangements, the thermal insulation product may be manufactured in a planar shape (e.g., a panel) and the product may be subsequently appropriately formed into a desired non-planar shape (e.g., one or multiple times). For instance, one method disclosed herein includes heating a substantially gas-tight enclosure having a sealed interior portion to render the gas-tight enclosure substantially pliable, wrapping an inner surface of the gas-tight enclosure about at least a portion of a non-planar surface, and cooling the gas-tight enclosure to render the gas-tight enclosure substantially unpliable. A ratio of the thickness to a radius of curvature of the portion of the non-planar surface may be at least about 1 to 8, such as at least about 1 to 4.

Advantageously, the thermal insulation product may be conformed to non-planar surfaces of numerous different sizes, contours (e.g., radii of curvature) and dimensions; is not necessarily limited to reduced thicknesses (e.g., less than 2 mm) to conform to reduced radii of curvature; and does not necessarily require cryogenic conditions to maintain a substantially evacuated state within the gas-impermeable envelope. In one embodiment, the pressure within the interior portion of the gas-tight enclosure may be not greater than about 500 mbar after the cooling step even when a fluid disposed within the non-planar surface (e.g., within a pipe or tank) is at a temperature of at least about 80° C., such as at least about 140° C., or at least about 200° C. For instance, the cooling step may include cooling the gas-tight enclosure down to a substantially ambient temperature. In another embodiment, the gas-tight enclosure may be secured to the non-planar surface (e.g., such as via adhesives and/or in other appropriate manners).

In one arrangement, the thermal insulation product may be manufactured by way of sealing the support material and at least one vapor (e.g., steam) within the interior portion of the gas-impermeable envelope where the interior portion of the gas-impermeable envelope is at a first pressure during the sealing step, and then condensing at least a portion of the gas after the sealing step. Condensing at least a portion of the gas after the sealing step reduces the pressure within the interior portion of the gas-impermeable envelope from the first pressure down to a second pressure (e.g., a substantially evacuated pressure similar to or better than that of current VIPs) free of many of the additional process steps, capital investment, energy consumption and the like associated with having to manually evacuate (e.g., with a mechanical pump) the interior of the envelope, sufficiently drying the support material before sealing, and the like.

Generally, the reduction in pressure results from the principle that a quantity of molecules will take up less volume in an impermeable container (e.g., envelope) in a liquid state compared to the same quantity of molecules in a gaseous state (e.g., as a vapor). For instance, the vapor can be initially sealed within the gas-impermeable envelope at a temperature that is both above a boiling point (e.g., condensation point) of the substance making up the vapor as well as above ambient temperatures. The vapor can then be cooled down to a temperature below the condensation/boiling point of the substance making up the vapor, such as down to or above an ambient temperature, to condense at least a portion of the vapor and thereby create a lower pressure state or an at least partial vacuum within the gas-impermeable envelope. For purposes of this discussion, all references to the boiling or boiling point of a particular substance or compound making up the vapor or liquid will be in the context of atmospheric pressure.

As the vapor is initially sealed at an elevated temperature (i.e., with respective to an ambient temperature) and then cooled down to ambient to at least partially condense the vapor and thereby create and maintain the lower pressure state within the gas-impermeable envelope, the gas-impermeable envelope advantageously need not necessarily be maintained in contact with a cold source (e.g., such as a cryogenic tank or pipeline) to maintain the low pressure state within the gas-impermeable envelope in use. Furthermore, the first/initial pressure within the sealed gas-impermeable envelope (i.e., before the condensing step) can be at or slightly above ambient pressure which eliminates or at least limits the need for creating a vacuum within the gas-impermeable envelope with convention mechanical pumping mechanisms during manufacture.

Many vapors and/or vaporous mixtures are envisioned that may be sealed within the gas-impermeable enclosure and condensed (e.g., via reducing an elevated temperature of the vapor(s) down to a temperature at or above ambient temperatures) to enact the disclosed pressure reduction within the gas-impermeable envelope (which correspondingly reduces the gas phase conduction within the envelope). In one arrangement, the vapor(s) may have a thermal conductivity lower than that of nitrogen/air. Additionally or alternatively, the vapor(s) may be a vapor or vapors whose pressure within the gas-impermeable envelope drops by a larger amount than would air for a common reduction in temperature. In this regard, the vapor/vaporous mixture may be considered an "air replacement" that displaces at least some of the air that would otherwise be present within the interior portion of the gas-impermeable enclosure.

For instance, sealing air within the gas-impermeable envelope at sea level and at a temperature of about 100° C. and then cooling the gas-impermeable envelope down to a temperature of about 20° C. would cause the pressure within the gas-impermeable envelope to drop from about 1000 millibars (mbar) down to about 785 mbar. In contrast, and in accordance with one embodiment of the present disclosure, sealing steam (i.e., vaporous water or $H_2O$) within the gas-impermeable envelope at a temperature of at least about 100° C. and then cooling the gas-impermeable envelope down to a temperature of about 20° C. will cause the pressure within the gas-impermeable envelope to drop from about 1000 mbar down to a pressure below 785 mbar, such as down to about 20 mbar. In addition to or other than steam, vapors that may be sealed within the disclosed gas-impermeable envelope include, but are not limited to, paraffins such as n-pentane, chlorohydrocarbons such as carbon tetrachloride, CFCs, HCFCs, oxygenated organics such as acetone and ethylene glycol, and a wide range of vapors. For instance, the vapors may be selected based on one or more properties or characteristics of the vapors such as thermal conductivity at one or more particular temperatures, mean free path at a particular pressure and/or temperature, vapor pressure difference between two particular temperatures, and/or the like.

In one arrangement, two or more different vapors may be sealed within the gas-impermeable envelope to impart any desired properties or characteristics to the thermal insulation product to be formed (e.g., properties/characteristics not achievable through use of a single vapor). For instance, the vapor pressure/temperature curve for a vaporous mixture of two or more vapors sealed within the gas-impermeable envelope can be specifically tailored to a desired end-use of the product by appropriately selecting the two or more vapors (e.g., so that the resulting vapor pressure within the product achieves a desired level for a particular use temperature).

In some situations, the thermal insulation products and methods disclosed herein may be used to provide insulation in hot temperature applications. That is, the disclosed thermal insulation products may be used to maintain an interior of an enclosure (e.g., of a non-planar object such as processing piping, tank, vat, etc. containing any appropriate fluid, solid, etc.) at a particular hot temperature, such as above about 100° C. As an example, the specific vapor(s) included within the interior portion of the gas-impermeable envelope may be chosen so that the boiling point is above the temperature of the particular environment and context in which the finished thermal insulation product is to be used. For instance, for relatively hot applications (e.g., process piping through which a fluid flows or is contained, ovens, environmental test chambers, aerospace, exhaust gases, etc., such as at temperatures of greater than 100° C., greater than 150° C., etc.), it may be desirable to utilize a vapor that has a boiling point higher than that of water (i.e., higher than 100° C.) to allow the vapor to be in equilibrium with a condensed state (e.g., the liquid).

For instance, the vapor (e.g., or vaporous mixture) may be selected so that its boiling point is higher than the temperature of a particular contemplated hot temperature application. In one arrangement, the vapor may be in the form of an organic compound (e.g., alcohol, such as at least on diol) and/or a silicone-based compound (e.g., dimethyl polysiloxane compound). In another arrangement, the vapor may have a boiling point that is at least about 150° C. at about 1000 mbar of pressure. In this arrangement, for example, the interior portion of the gas-impermeable envelope may have a temperature that is at least about 125° C. after the condensing step (e.g., imparted by a particular hot temperature application). In another arrangement, the vapor may have a boiling point that is at least about 200° C. at about 1000 mbar of pressure. In this arrangement, for example, the interior portion of the gas-impermeable envelope may have a temperature that is at least about 125° C. after the condensing step, such as at least about 150° C. after the condensing step, or at least about 175° C. after the condensing step (e.g., imparted by a particular hot temperature application). In a further arrangement, the vapor may have a maximum molecular weight of not greater than about 200, such as not greater than about 150.

In addition to the innate thermal conductivity and density of the vapor within the gas-impermeable envelope, the Knudsen effect can also be employed to reduce or otherwise control gas phase conduction within the gas-impermeable envelope. That is, increasing the mean free path of the vapor (which can be controlled by selecting one or more particular vapors and/or reducing the pressure/density of the vapor(s)) to be approximately equal to or greater than an average pore size of the support material within the gas-impermeable envelope can greatly reduce or even substantially eliminate gas phase conduction within the envelope. In this regard, at least a portion of the vapor within the interior of the sealed gas-impermeable envelope can be condensed so that the remaining vapor within the interior of the sealed gas-impermeable envelope has a mean free path about equal to or larger than an average pore size of the support material.

In one arrangement, the support material may be in the form of an adsorbent material (e.g., powder(s), particulate(s), blend(s), and/or the like) having a relatively low thermal conductivity (i.e., low solid-phase conductivity, such as not greater than 0.005 W/mK), pores sized to facilitate the Knudsen effect (e.g., nanoporous materials), and being relatively inexpensive and/or lightweight (e.g., having a density of not greater than about 250 g/l). For instance, the support material may be a particular blend comprising a fine (e.g., nanoporous) powder (e.g., fumed silica and silica aerogels), available from, for example, Evonik, Essen, Germany. In one embodiment, the support material may include at least about 60 wt % of the fine powder. In another embodiment, the support material may include about 100 wt % of the fine powder.

In some arrangements, the support material may additionally include any appropriate quantity and/or type of an IR opacifier/radiation absorbent material (e.g., titania, silicon carbide, carbon black, and/or the like) for purposes of limiting radiative heat transfer through the support material. In one embodiment, the support material includes at least about 5 wt % of the IR opacifier. In another embodiment, the support material includes not greater than about 25 wt % of the IR opacifier.

Additionally or alternatively, the support material may also include one or more lightweight fibers to enhance the structural integrity of the resulting thermal insulation product, such as polyethylene fibers, polyester fibers, other plastic fibers, carbon fibers, glass fibers, metal fibers and/or other fibers. In one embodiment, the support material may include not greater than about 0.1 wt % of fibrous materials.

Additionally or alternatively, the support material may also include any appropriate structural filler (e.g., perlite) to enhance the structural integrity of the resulting thermal insulation product. In one embodiment, the support material may include at least about 10 wt % of the structural filler. In another embodiment, the support material may include not greater than about 70 wt % of structural filler.

Additionally or alternatively, the support material may also include any appropriate getter (e.g., oxygen/nitrogen getter) such as iron, barium, lithium, zeolites, etc. to maintain the low pressure state within the gas-impermeable envelope, such as by combining with the gas molecules chemically and/or by adsorption. In one embodiment, the support material includes at least about 0.01 wt % of a getter. In another embodiment, the support material includes not greater than about 1 wt % of a getter.

In the event that the fine powder (e.g., fumed silica) is combined with one or more additional components to form the support material, all of such components may be mixed in any appropriate manner to create a substantially homogenous composition. In one approach, the power/particular adsorbent material may be mixed with an IR opacifier to create a first mixture. This first mixture may then be mixed with a fibrous material and/or structural filler material to create the support material. In another approach, the powder/particulate adsorbent material, IR opacifier, fibrous material and/or structural filler material may be mixed simultaneously to create the support material.

In one arrangement, the support material may have a total porosity of at least about 80%. In another embodiment, the support material may have a total porosity of not greater than about 98%.

In one arrangement, the support material may have an average pore size of at least about 20 nanometers. In another embodiment, the support material may have an average pore size of not greater than about 2,000 nanometers, such as not greater than about 500 nanometers to facilitate the Knudsen effect.

In one arrangement, the support material may have a surface area of at least about 50 $m^2/g$. In another embodiment, the support material may have a surface area of not greater than about 1,500 $m^2/g$.

As noted, the support material is sealed along with a vapor within an interior portion of a substantially gas-impermeable envelope before the vapor is condensed to reduce the pressure within the interior portion. Any appropriate or suitable material may be utilized to form the gas-impermeable envelope such as plastic laminates, metallized plastics, metals, metal-foils (e.g., stainless steel for higher temperatures), and electroplated metals, to name a few. In one arrangement, the gas-impermeable envelope may be made of an Ethylene Vinyl Alcohol (EVOH) barrier film, a coextruded polyethylene (PE)/EVOH barrier film, a metalized EVOH barrier film, and/or the like. The type and shape of the gas-impermeable envelope may be generally related to the application in which the thermal insulation product is to be utilized. In shipping applications, for example, it may be desirable to utilize thin, panel-shaped enclosures made of a metallized plastic (e.g., metallized Polyethylene terephthalate (PET)). In one embodiment, the gas-impermeable envelope may include a thickness of at least about 10 microns, such as at least about 25 microns. In another embodiment, the gas-impermeable envelope may include a thickness of not greater than about 300 microns, such as not greater than about 200 microns.

The sealing step may be accomplished in any known manner suitable to the type of gas-impermeable envelope employed. For example, heat sealing may be used for plastic laminate enclosures and welding for metal enclosures. In relation to the former and in one embodiment, a flow wrapping machine may be utilized to seal the gas-impermeable enclosure about the support material and gas/gas mixture.

Furthermore, the condensing step may be accomplished in any appropriate manner, such as by cooling the vapor to a temperature below a boiling point of the vapor after the sealing step. In one arrangement, the gas-impermeable envelope may include spaced apart first and second sidewalls, and the cooling step may include respectively contacting the first and second sidewalls with first and second surfaces having temperatures below the boiling point of the vapor. For instance, each of the first and second surfaces may form parts of respective first and second molding members of a mold and collectively define a mold cavity. In this case, the first and second molding surfaces may be brought together over the first and second sidewalls of the envelope under slight pressure to cool the envelope and the vapor thereinside to simultaneously condense the vapor as well as form a thermal insulation product from the envelope into a desired shape (e.g., a relatively planar, rectangular-shaped panel; a non-planar shape such as an L-shaped or U-shaped panel; and/or the like).

In another arrangement, an outer surface of the gas-impermeable envelope may be contacted with a cooling liquid having a temperature below the boiling point of the vapor. For instance, a cooling liquid such as water or the like may be sprayed or otherwise applied over the outer surface of the gas-impermeable envelope to cool and thereby condense at least a portion of the vapor inside the envelope. In a further arrangement, the gas-impermeable envelope (and the vapor and support material therein) may be passively cooled under a substantially ambient temperature down to the ambient temperature to condense at least a portion of the gas inside the envelope.

In one variation, the support material and vapor may be sealed (e.g., at an ambient pressure) within a gas/vapor-permeable or porous enclosure (e.g., that is still liquid impermeable), where the gas-permeable enclosure (with the support material and vapor disposed thereinside) is sealed (e.g., again, at the same ambient pressure) within the interior portion of the gas-impermeable envelope before the vapor mixture is condensed (e.g., via cooling the gas-impermeable envelope down to ambient temperature or some temperature above ambient temperature) to lower the pressure within the gas-impermeable envelope. More specifically, it has been found that doing so provides a number of benefits such as facilitating handling of the support material and vapor, facilitating sealing of the gas-impermeable envelope (e.g., by limiting the degree to which the support material becomes disposed between the two surfaces that are to be sealed), and/or the like. For instance, the gas-permeable enclosure may be similar to those used for desiccant bags, fiberglass bundling, etc.

In one arrangement, the support material and vapor mixture may first be disposed and sealed within the gas-permeable enclosure, and then the sealed gas-permeable enclosure may be sealed within the gas-impermeable envelope (e.g., via encapsulating the gas-impermeable envelope about the sealed, gas-permeable enclosure). For instance, the support material and vapor may be simultaneously injected into the gas-permeable enclosure. As another example, the support material may be injected first and the vapor second, or vice versa. In one variation, the support material may be injected or otherwise disposed into the gas-permeable enclosure, a liquid (e.g., water) may be applied over the support material within the gas-permeable enclosure (e.g., via spraying the liquid over the support material), and the support material and liquid may then be heated above the boiling point of the liquid to convert at least some of the liquid into a gas/gas mixture and drive some or all air out of the gas-permeable enclosure.

After sealing the gas-permeable enclosure (where the sealing may be performed before or after heating the support material and liquid above the boiling point of the liquid), the sealed gas-permeable enclosure (which has the support material and vapor thereinside) may be sealed within the gas-impermeable envelope before eventually being cooled to re-condense the vapor within the gas-permeable and gas-impermeable enclosures back into the liquid state and thereby reduce the pressure within the resulting thermal insulation product. In one embodiment, and regardless of how the support material and vapor are disposed within the interior portion of the gas-impermeable envelope, a desiccant may, just before sealing of the gas-impermeable envelope, be disposed between the gas-impermeable envelope and the gas-permeable enclosure to further reduce the pressure within the sealed gas-impermeable envelope (e.g., by such as adsorbing or absorbing the condensed liquid, chemically bonding with the molecules of the condensed liquid, and/or the like).

In addition to the above-discussed advantages (i.e., no or little need for mechanical vacuum pumps, drying of the support material, etc.), the thermal insulation products produced by the processes disclosed herein can also be designed to have a reduced overall (e.g., bulk) density compared to current VIPs (e.g., 10-20% lower). For instance and in contrast to current VIPs, a smaller quantity of or even no fibrous materials needs to be utilized within the support material of the present thermal insulation products because mechanical pumping mechanisms need not be used to draw the vacuum within the present thermal insulation products. Stated otherwise, the extra structural integrity provided to the products by such fibrous materials may not be necessary as mechanical pumping mechanisms need not be used, as the present thermal insulation products need not be forcefully pressed to form the products into a desired shape, and the like.

In another regard, a smaller quantity of or even no IR opacifiers/radiation absorbent materials needs to be utilized within the support material of the present thermal insulation products as at least some of the vapors that may be sealed along with the support material within the gas-impermeable enclosure serve to absorb IR radiation and thereby limit radiative heat transfer through the thermal insulation product. For instance, when silica (e.g., nanoporous silica) is utilized as the primary insulation material in the core of current VIPs, a radiation absorbent material (e.g., carbon black) is often added in an attempt to block the "IR absorption gaps" of the silica (i.e., those IR wavelengths not absorbable by the silica). However, when silica is utilized as the adsorbent powder/particulate of the support material of the present thermal insulation products disclosed herein, a radiation absorbent material/IR opacifier need not necessarily be used in the case of at least some vapors sealed with the silica within the gas-impermeable envelope. For instance, in the case of a vapor such as steam, the condensed steam (e.g., water) tends to naturally absorb those IR wavelengths not absorbable by the silica. In this regard, the number of solid "components" making up the core of the present thermal insulation products can be reduced (e.g., by eliminating/reducing the fibrous materials and/or IR opacifier) in relation to the core of current VIPs thereby resulting in lower bulk densities and simplified manufacturing processes than those of current VIPs.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 2b is a sectional view similar to that in FIG. 2a, but after condensing of at least some of the vapor within the interior of the product to reduce the pressure within the product.

FIG. 4a is a block diagram depicting an assembly line for making the thermal insulation product of FIG. 1.

FIG. 4b is a block diagram similar to that in FIG. 4a, but at another stage of the assembly line.

FIG. 4e is a block diagram similar to that in FIG. 4d, but at another stage of the assembly line.

DETAILED DESCRIPTION

The present disclosure is generally directed to highly efficient thermal insulation products (e.g., panels, systems, methods of use, methods of manufacture, etc.) for use in insulating cylindrical or non-planar objects such as pipes, tanks, and the like in manners that yield significant cost/performance advantages over existing thermal insulation products. As will be discussed herein, the disclosed utilities allow for significant increases in thermal performance, increases in the range of operating conditions in which the disclosed utilities can be utilized, reductions in costs, and the like.

Figure 1:
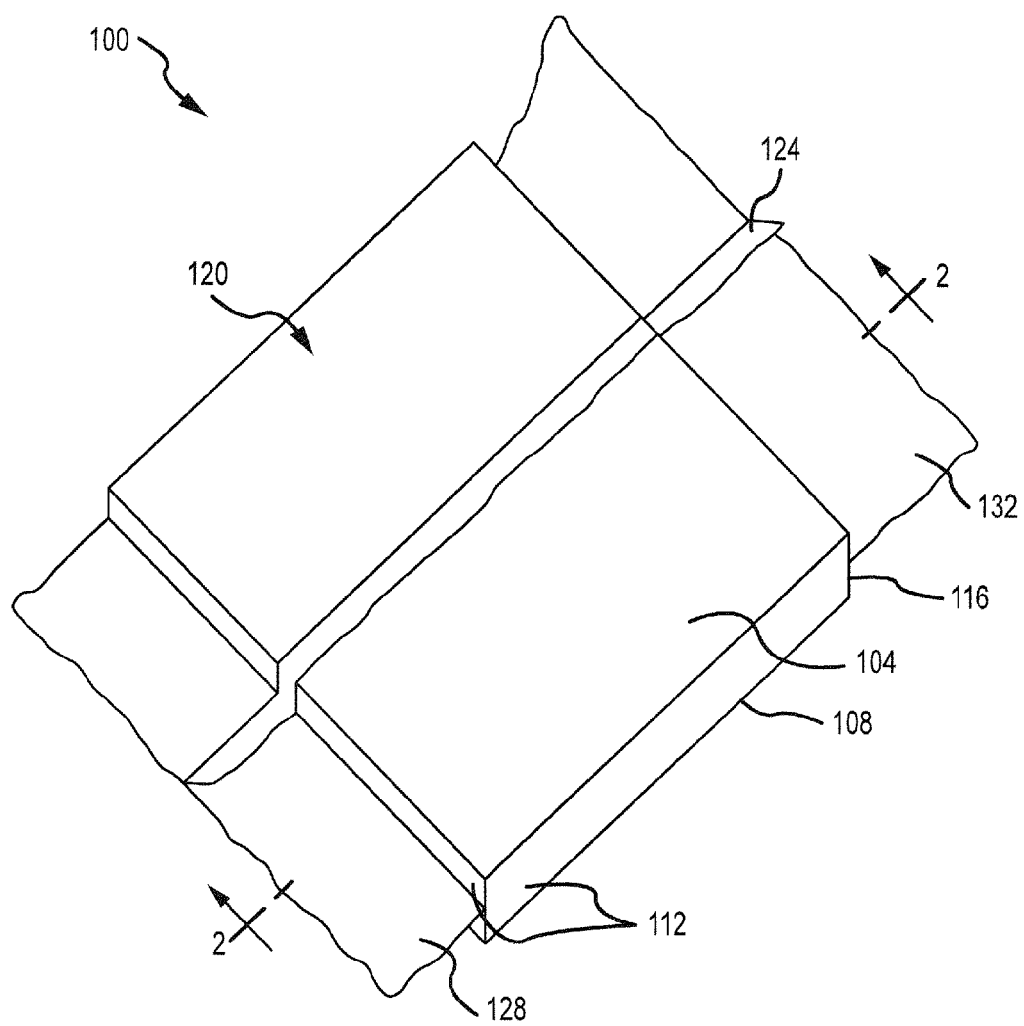
FIG. 1 is a perspective view of a thermal insulation product produced according to one embodiment disclosed herein.

FIG. 1 presents a perspective view of one thermal insulation product 100 (e.g., panel) that may be produced using the disclosed processes. As will be discussed in more detail in the discussion that follows, the product 100 may be utilized in numerous contexts where it is desired to protect a system of interest having a non-planar surface from heat flow into or out of its surroundings such as, but not limited to, piping, refrigeration equipment, storage tanks, and the like. As shown in FIG. 1, the product 100 may be in the form of a generally "planar" member having opposing first (e.g., top) and second (e.g., bottom) sides 104, 108; a plurality of outer edge portions 112; and a plurality of corner portions 116. A gas-impermeable envelope 120 (e.g., gas-tight enclosure) may form an outer boundary or layer of the product 100 and may have portions sealed together in any appropriate manner (e.g., heat seal, adhesives, etc.) along a hermetically sealed portion 124 to seal an insulative core thereinside as will be discussed in more detail below.

The gas-impermeable envelope 120 may be constructed from any appropriate material(s) such as plastic laminates, metallized plastics, metals, metal-foils, electroplated metals, and/or the like. Depending upon the particular sealing process utilized, the gas-impermeable envelope 120 may have a number of flaps such as first and second flaps 128, 132 that may, if desired, be folded and secured onto the first or second surfaces 104, 108 of the product 100, at least partially cut off and removed, and/or the like. While the product 100 has been shown in FIG. 1 in the form of a generally planar panel, it is to be understood that the process disclosed herein may be utilized to make numerous other shapes, forms, sizes, contours, etc. of products 100 such as cylindrical-shaped, L-shaped, U-shaped, trapezoidal, square-shaped, angled edges, tongue in groove edges, etc.

Figure 2A:
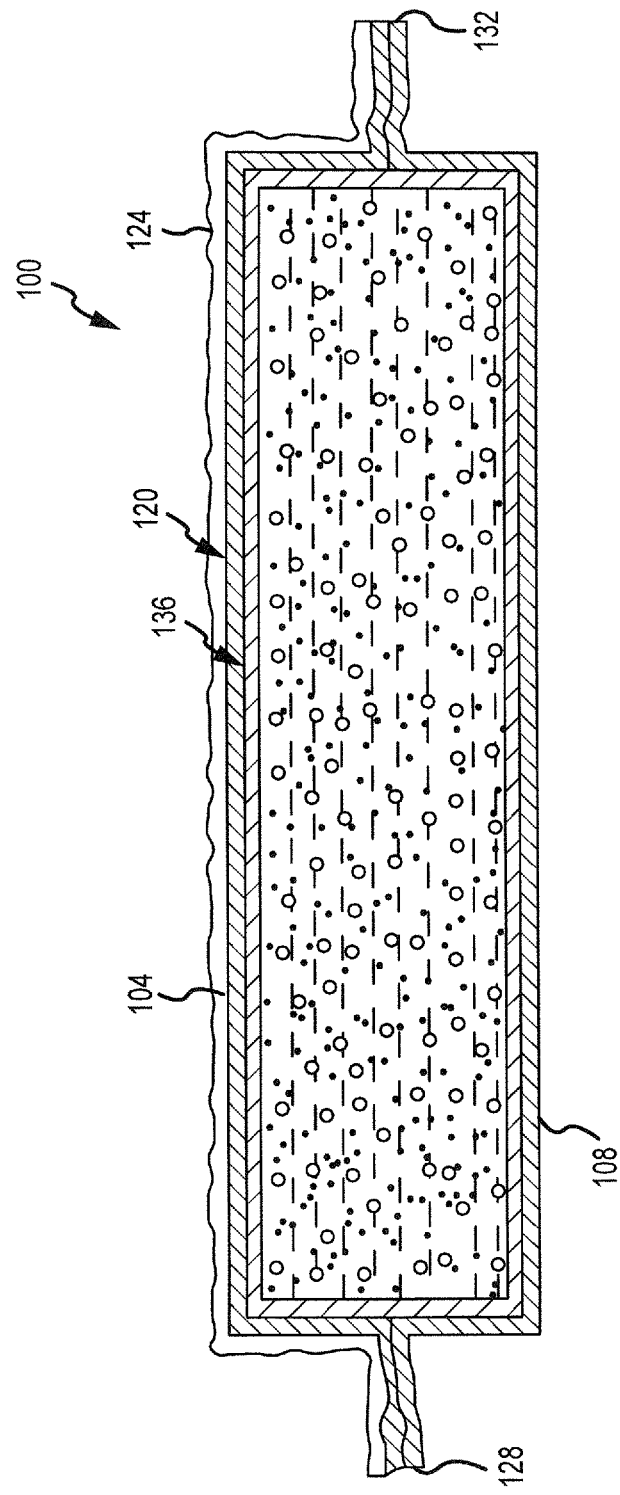
FIG. 2a is a sectional view of the product of FIG. 1 before condensing of vapor within an interior of the product to reduce the pressure within the product.
Figure 3:
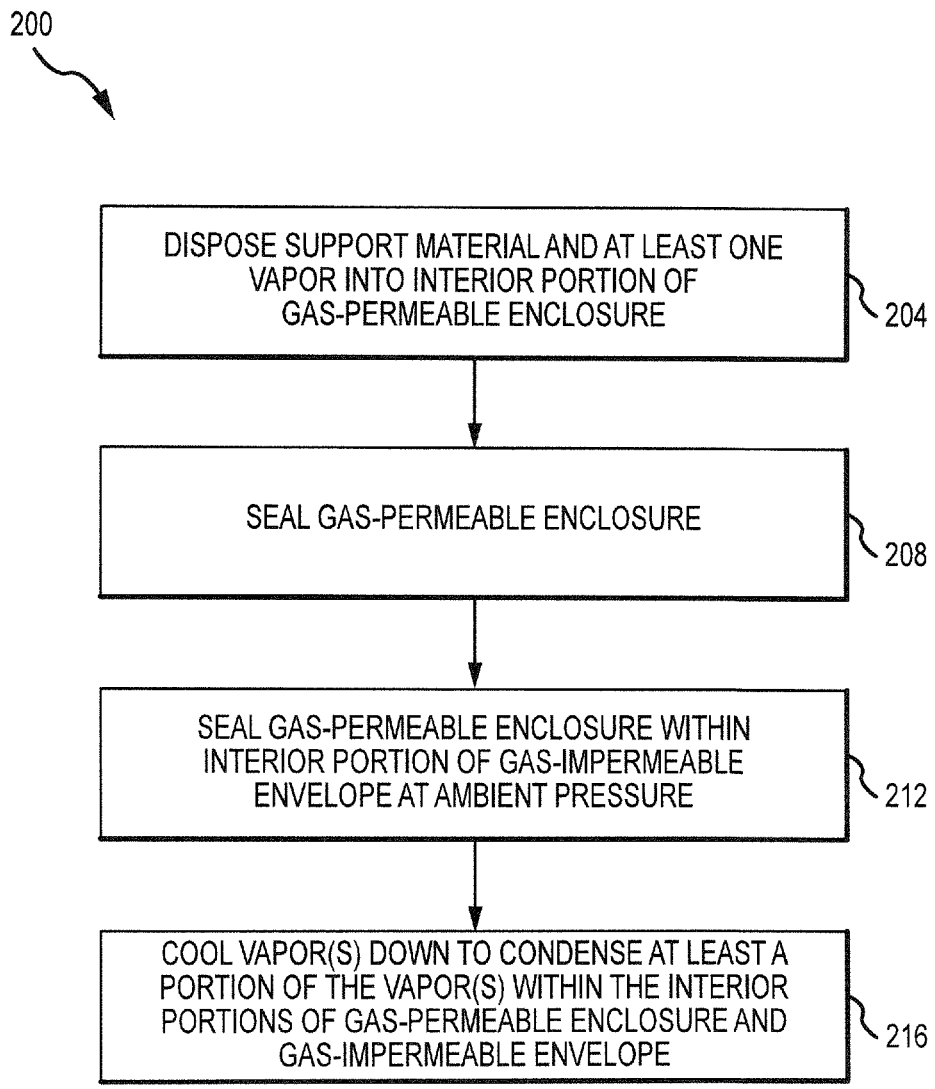
FIG. 3 is a flow diagram illustrating a method of making the thermal insulation product of FIG. 1, according to one embodiment.

Turning now to FIG. 3, one embodiment of a method 200 for making the thermal insulation product 100 of FIG. 1 will now be discussed. In conjunction with FIG. 3, reference will also be made to the sectional views of the product 100 presented in FIGS. 2a-2b as well as to the various stages of an assembly line 300 for producing the product 100 presented in FIGS. 4a-4e. As shown in FIG. 3, the method 200 may include disposing 204 a support material (e.g., core) and at least one vapor into an interior portion of a gas-permeable enclosure (e.g., a porous barrier such as that used for desiccant bags, fiberglass bundling, etc.) and then sealing 208 the support material and the at least one vapor within the interior portion of the gas-permeable enclosure (e.g., where the disposing 204 and sealing 208 substantially occur at an ambient pressure).

As discussed previously, the support material may be in the form of an adsorbent material (e.g., powder(s), particulate(s), blend(s), and/or the like) having a relatively low thermal conductivity and pores sized to facilitate the Knudsen effect (e.g., a fine powder such as fumed silica, silica aerogels, etc.).

In some situations, one or more additives may be mixed in with the adsorbent material (and thereby form part of the support material) to add one or more desired properties or qualities to the support material (and thereby the product 100 to be formed). For instance, one or more of an IR opacifier (e.g., to limit radiative heat transfer through the support material), a lightweight fibrous material and/or a structural filler material (e.g., to enhance the structural integrity of the product 100 to be formed), a getter (e.g., to maintain the low pressure or evacuated state within the product 100 to be formed), and/or the like may be included.

Furthermore, many vapors and/or vaporous mixtures are envisioned that may be disposed and sealed within the gas-permeable enclosure along with the support material. The vapor may be a vapor with relatively low thermal conductivity (e.g., lower than that of nitrogen/air) and/or may be a vapor whose pressure drops by a desired amount along with a particular reduction in temperature. As discussed herein, the vapor is, once sealed within a gas-impermeable envelope, cooled and condensed to reduce the pressure within the gas-impermeable envelope. In this regard, it may be advantageous to utilize vapors that have a boiling point above the operating temperatures of the environment in which the product 100 to be formed is to be used so that the vapor remains condensed and the inside of the product 100 remains in the low pressure state during use of the product 100.

In addition to or other than steam (i.e., water), vapors that may be sealed within the gas-permeable envelope include, but are not limited to, paraffins such as n-pentane, chlorohydrocarbons such as carbon tetrachloride, CFCs, HCFCs, oxygenated organics such as acetone and ethylene glycol, and/or a wide range of vapors.

With reference to FIG. 2a, for instance, the support material (represented by the pattern of dots) and the at least one vapor (represented by the series of dashed lines and small circles) may be disposed and sealed within an interior portion gas-permeable enclosure 136 in any appropriate manner. Turning to FIG. 4a, for instance, the support material and at least one vapor may be initially maintained in respective enclosures 308, 312 (e.g., tanks, pipes, vessels, etc.) as part of an assembly line 300 that may be used to make the thermal insulation products 100 disclosed herein. The enclosures 308, 312 may be respectively fluidly interconnected (e.g., via pipes, tubes, valves, etc.) to a chamber 316 to allow for the injection of the support material and at least one vapor into the chamber 316 and intermixing thereof. For example, a gas-permeable enclosure 136 may be moved along the assembly line 300 via a conveyor belt 304 or the like from one position as shown in FIG. 4a to another position as shown in FIG. 4b, whereupon a mixture of the support material and the at least one vapor may be injected or otherwise appropriately disposed into the gas-permeable enclosure 136. The gas-permeable enclosure 136 may then be sealed in any appropriate manner (e.g., such as by heat-sealing; adhesive; welding such as RF welding, solvent welding, or ultrasonic welding; and/or the like) to contain the support material and at least some of (e.g., most of) the vapor within an interior portion thereof.

As discussed, the at least one vapor, once sealed within the gas-impermeable envelope 120, will be eventually cooled down to a temperature below a boiling point of the at least one vapor (e.g., at or above an ambient temperature) to reduce the pressure within the gas-impermeable envelope 120 (as well as to eliminate or at least reduce the need to maintain the product 100 in contact with a cold source to maintain the vapor in the condensed, low-pressure state). In this regard, at least a portion of the assembly line 300, such as between and including the injection of the support material/gas mixture from the chamber 316 into the gas-permeable enclosure 136 up to the sealing of the sealed gas-permeable enclosure 136 within the gas-impermeable envelope 120 (e.g., at station 320, discussed below), may be maintained within any appropriate heating zone 328 that is configured to maintain the at least one vapor at a temperature above its boiling point and limit premature condensation of the vapor. For instance, the heating zone 328 may be in the form of an enclosure made up of vinyl drapes, plastic walls, insulated walls, air curtains, and/or the like.

The support material and at least one vapor need not necessarily be injected substantially simultaneously into the chamber 316 or even into the interior portion of the gas-permeable enclosure 136. In one arrangement, the support material may be injected from the enclosure 308 into the gas-permeable enclosure 136 (e.g., with or without passing through the chamber 316), and then the at least one vapor may be injected from the enclosure 312 into the gas-permeable enclosure 136 (e.g., also with or without passing through the chamber 316). In another arrangement, the support material may be injected or otherwise disposed into the gas-permeable enclosure 136; a liquid (e.g., water) may be applied over the support material (either before or after the support material is injected into the gas-permeable enclosure 136); and then the support material may be heated above the boiling point of the liquid to convert at least some of the liquid into the at least one vapor and thereby drive some or all air out of the gas-permeable enclosure 136. Other manners of disposing and sealing the support material and at least one vapor into the interior portion of the gas-permeable enclosure 136 are also envisioned and included within the scope of the present disclosure.

Once the support material and at least one vapor have been sealed within the interior portion of the gas-permeable enclosure 136, the method 200 of FIG. 3 may include sealing 212 the sealed gas-permeable enclosure 136 within an interior portion of a gas-impermeable envelope (e.g., at a pressure substantially equal to an ambient pressure). FIG. 2a illustrates the sealed gas-permeable enclosure 136 (having the support material and at least one vapor contained therein) being sealed within an interior portion of the gas-impermeable envelope 120. At this point, for instance, the sealed interior portion of the gas-impermeable envelope 120 may have about 1 gram of a liquid per liter of a total volume of the sealed interior portion of the gas-impermeable envelope 120 (e.g., at a pressure substantially equal to ambient pressure).

Figure 4C:
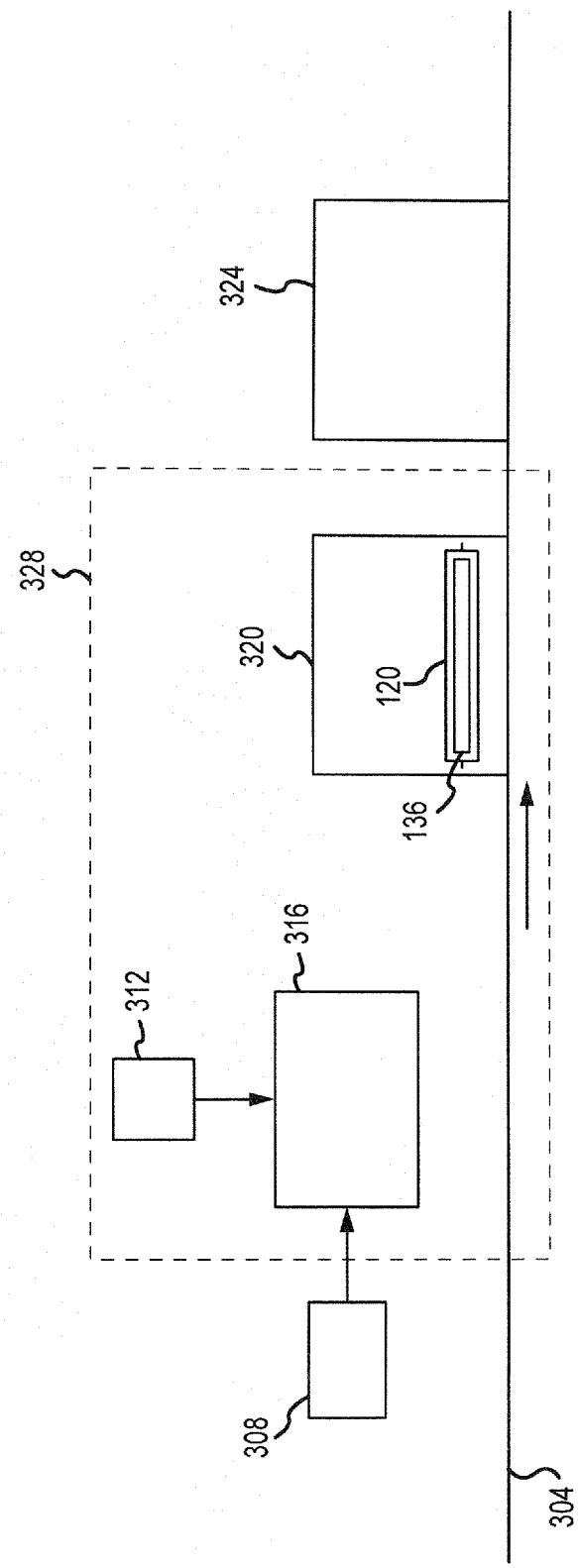
FIG. 4c is a block diagram similar to that in FIG. 4b, but at another stage of the assembly line.

In one arrangement, the sealed gas-permeable enclosure 136 may be moved along the assembly line 300 by the conveyor belt 304 from the position shown in FIG. 4b to that shown in FIG. 4c whereupon the sealed gas-permeable enclosure 136 may enter a gas-impermeable envelope encapsulation/sealing station 320. For instance, the station 320 may include at least a portion of a flow wrapping machine (e.g. including spools/reels of the gas-impermeable envelope material, heat sealing equipment, etc., not shown) operable to wrap and seal the sealed gas-permeable enclosure 136 within the gas-impermeable envelope 120. In some situations, any appropriate desiccant may be included within the interior portion of the gas-impermeable envelope 120 but outside of the gas-permeable enclosure 136 for use in further reducing vapor pressure within the gas-impermeable envelope 120 upon cooling. In any event, the sealing 212 may occur with the at least one vapor being at a temperature above an ambient temperature (e.g., such as just outside of the heated zone 328).

After the sealing 212, the method 200 of FIG. 3 may then include cooling 216 the at least one vapor (which is contained along with the support material within the interior portion of the gas-impermeable envelope 120) down to a temperature that is at least below the boiling point of the vapor (i.e., the substance(s) making up the vapor) to condense at least a portion of the at least one vapor within the gas-impermeable envelope 120 and thereby reduce the pressure within the gas-impermeable envelope 120 from a first pressure upon the sealing 212 down to a second pressure after the cooling 216 (e.g., free of energy intensive pumping mechanisms). For instance, the at least one vapor may be cooled down to a temperature that is at or above an ambient temperature. In one arrangement, the difference between the first and second pressures may be at least about 250 mbar, such as at least about 500 mbar at least about 700 mbar, or even at least about 900 mbar. In another arrangement, the reduced second pressure may be not greater than about 700 mbar, such as not greater than about 500 mbar, not greater than about 300 mbar, such as not greater than about 100 mbar, or even not greater than about 50 mbar. In a further arrangement, a time between the completion of the sealing 212 and the reduction of the first pressure to the second pressure during the cooling 216 may be not greater than about 60 minutes, such as not greater than about 10 minutes.

Turning now to FIG. 2b which illustrates a sectional view of the product 100' after the cooling 216, it can be seen how at least a portion of the at least one vapor (represented by the series of dashed lines and small circles in FIG. 2a) has condensed into a liquid phase (represented by the tighter series of dashed lines at the bottom of the interior portion of the gas-permeable enclosure 136 and gas-impermeable envelope 120 in FIG. 2b). It can also be seen how any remaining vapor within the interior portion of the gas-impermeable envelope 120 after the cooling 216 is in a reduced density or expanded state in FIG. 2b compared to in FIG. 2a (e.g., note how the series of dashed lines and small circles is less dense in FIG. 2b compared to in FIG. 2a). In other words, the cooling 216 converts at least a portion of the vapor into a liquid phase so that the ratio of molecules within the interior portion of the gas-impermeable envelope 120 in the gas phase compared to those in the liquid phase decreases resulting in a decrease in pressure within the gas-impermeable envelope 120.

In one arrangement, the sealed gas interior portion may have at least about 2 grams of a liquid per liter of a total volume of the sealed interior portion of the gas-impermeable envelope 120 after the condensing/cooling 216. For instance, the sealed interior portion may have at least about 3 grams of a liquid per liter of a total volume of the sealed interior portion of the gas-impermeable envelope 120 after the condensing/cooling 216, such as at least about 4 grams of a liquid per liter. As another example, the sealed interior portion may have not greater than about 7 grams of a liquid per liter of a total volume of the sealed interior portion of the gas-impermeable envelope 120 after the condensing/cooling 216, such as not greater than about 6 grams of a liquid per liter, such as not greater than about 5 grams of a liquid per liter.

As another example, the grams of liquid per liter of the total volume of the sealed interior portion of the gas-impermeable envelope 120 may be at least about two times greater (e.g., three times greater, four times greater, etc.) after the condensing/cooling 216 as compared to before the condensing/cooling 216 (e.g., such as just after the sealing 212). It is noted that the liquid has been illustrated as being concentrated at the bottom of the interior portion of the gas-impermeable envelope 120 for purposes of facilitating the reader's understanding of the present disclosure and that the liquid may in reality be more disbursed within the support material throughout the interior portion of the gas-impermeable envelope 120.

For example, assume that the at least one vapor is steam and it is sealed along with the support material within the interior portion of the gas-impermeable envelope 120 at a temperature of just over about 100° C. In this regard, the pressure within the interior portion of the gas-impermeable envelope 120 may be about 1000 mbar (e.g., at or close to ambient pressure). Upon cooling of the gas-impermeable envelope 120 (and the steam and support material therein-side) down to a temperature near ambient temperature (e.g., down to about 20° C.), the pressure within the interior portion of the gas-impermeable envelope 120 may drop to only about 20 mbar. The pressure within the gas-impermeable envelope 120 may thus advantageously substantially remain at the 20 mbar level (or other low pressure level) for uses of the resulting product 100 in temperatures substantially the same as the ambient temperature at which the product 100 was cooled 212.

For other vapors (e.g., n-pentane), the interior portion of the gas-impermeable envelope 120 may have a first temperature during the sealing step different (e.g., less) than that at which steam was sealed 212 within the envelope 120, such as about 70° C., and/or a second temperature after the cooling step 216 different (e.g., greater) than that to which the envelope 120 was cooled 216, such as about 40° C. Of course, further pressure reductions within the product 100 may result in cold applications (e.g., refrigeration, shipping containers) in which the product 100 is disposed adjacent a cold source that causes further condensation of vapor remaining within the product 100. Additional pressure reductions may result from the use of different types of support material, pore sizes or overall porosities thereof, getters, and/or the like.

Figure 4D:
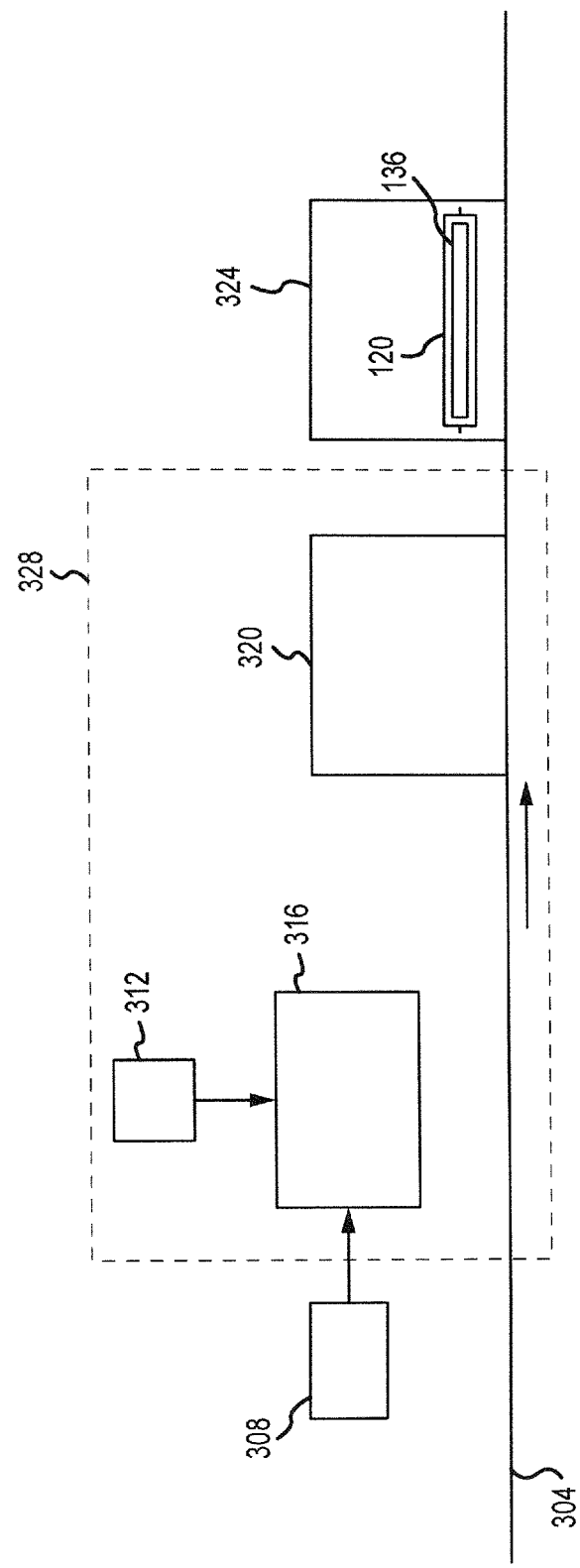
FIG. 4d is a block diagram similar to that in FIG. 4c, but at another stage of the assembly line.

In any event, the sealed gas-impermeable envelope 120 may be moved along the assembly line 300 by the conveyor belt 304 from the position shown in FIG. 4c to that shown in FIG. 4d whereupon the sealed gas-permeable enclosure 120 may enter any appropriate cooling station 324 designed to cool the at least one vapor below its boiling point to condense at least a portion of the vapor into a liquid phase. It is noted that before and at least partially during the time the sealed gas-impermeable envelope 120 is cooling, it may be at least partially pliable (e.g., bendable by hand). In one arrangement, the cooling station 324 may include opposing plates or surfaces having temperatures below the boiling point of the at least one vapor, where the opposing surfaces are configured to respectively contact the first and second sides 104, 108 (e.g., see FIG. 2b) of the product 100.

For instance, the first and second surfaces may lightly contact or press the first and second sides 104, 108 of the product 100 to simultaneously cool the vapor below its boiling point (e.g., down to an ambient temperature) and form the product 100 into more precise or exact dimensions, but need not exert any substantial amounts of pressure against the first and second sides 104, 108 of the product 100 (e.g., because only minimal pressure may be required to maintain thermal contact and guide shrinkage into a desired final shape). In one embodiment, at least one of the opposing surfaces may have a depression, cavity, or the like, the shape of which is a desired shape of the product 100 to be formed (e.g., similar to a mold cavity). For instance, movement of at least one of the surfaces towards the other of the surfaces may cause the product 100 to fill and expand in the cavity until the product 100 has assumed the shape of the cavity (e.g., because, as discussed above the product 100 may be at least partially pliable at least at the beginning of the cooling stage). As a result, the product 100 may be able to achieve increased dimensional stability and/or tighter tolerances. In another arrangement, the cooling station 324 may be configured to spray a cooling liquid such as water or another liquid (e.g., having a temperature below the boiling point of the gas) over the outside of the product 100 to accelerate condensation of the vapor therewithin.

As discussed herein, the product may advantageously be used to insulate numerous types of non-planar surfaces or cylindrically-shaped surfaces such as pipe, storage tanks, and the like. In one arrangement, the method 200 may include imparting or otherwise forming the product 100 into any appropriate non-planar shape before or at least during the cooling step 216 (i.e., while the product 100 is still at least partially pliable and before the cooling step 216 has completed) so that the product is in the non-planar shape upon completion of the cooling step 216 (i.e., so that the product is substantially rigid or unpliable in the non-planar shape after the cooling step 216). Numerous manners of conforming and maintaining the product 100 in a desired non-planar or cylindrical shape while the cooling step 216 is occurring are envisioned and encompassed herein. In one arrangement, one of the first and second sides 104, 108 (e.g., outer and inner surfaces, respectively) may be formed into a concave contour so that the product forms at least a partial cylinder (e.g., half cylinder or the like), where the other of the first and second sides 104, 108 would be correspondingly formed into an at least partially convex contour. In another arrangement, the product 100 may be formed into a substantially full cylinder (e.g., where the ends of the product substantially abut/face each other or are otherwise adjacent each other). In further arrangements, the product 100 may be formed into other types of non-planar contours depending up one or more particular end uses of the product 100.

Among other advantages, the product 100 may be configured to remain in an evacuated state (e.g., not greater than about 20 mbar at a temperature of about 20° C.) free of requiring cryogenic conditions to maintain the evacuated state and while maintaining any appropriate non-planar contour. Also in this regard, the product 100 may be constructed to provide improved ratios of radii of curvature of the concave surface of the product 100 (or of the non-planar surface over which the product is applied or disposed) to thickness of the product 100 (i.e., the distance between the first and second sides 104, 108). More specifically, existing VIPs can sometimes be applied about curved surfaces having decreasing radii of curvature, but with the drawback of decreasing VIP thicknesses (i.e., due to the reduced thermal performance that comes with decreasing VIP thickness).

In this regard, the ratio of the thickness of the product 100 to the radius of curvature of the concave surface of the product 100 (or of the non-planar surface over which the product is applied or disposed) may be at least about 1 to 8, such as at least about 1 to 4 or at least about 1 to 2. For instance, the radius of curvature of the concave surface of the product 100 (or of the non-planar surface) may be between about 3 mm to 100 mm. In one arrangement, the radius of curvature of the concave surface of the product 100 may be not greater than about 100 mm, such as not greater than about 30 mm. As another example, the thickness of the product 100 may be at least about 2 mm, such as at least about 20 mm, or at least about 40 mm. As a further example, the thickness of the product 100 may in other embodiments be not greater than about 100 mm, such as not greater than about 80 mm, or not greater than about 60 mm.

In any event, the conveyor belt 304 may eventually move the finished product 100 out of the cooling station 324 as shown in FIG. 4e whereupon the product 100 may be ready for use, subjected to additional processing (e.g., securing or removal of the flaps 128, 132; quality control; etc.). In one arrangement, the finished product 100 may have a density (e.g., bulk density) of at least about 80 g/l. In another arrangement, the finished product 100 may have a density of not greater than about 280 g/l. In one arrangement, the finished product 100 may have a thermal resistance of at least about 0.5 m$^2$·K/W. In one arrangement, the finished product 100 may have a thermal conductivity of not greater than about 0.010 W/mK at room temperature. It will be readily appreciated that many additions and/or deviations may be made from the specific embodiments disclosed in the specification without departing from the spirit and scope of the invention.

In one arrangement, the gas-impermeable envelope and vapor thereinside may be cooled 216 (e.g., by the cooling station 324 of FIG. 4d) down to an initial temperature (e.g., about 60° C. in the case of the vapor being steam) at which the gas-impermeable envelope can at least maintain a desired shape so that a plurality of sealed gas-impermeable envelopes can be stacked or otherwise stored for future use. For instance, cooling steam down to about 60° C. may cause the pressure within the sealed gas-impermeable envelope to drop from about 1000 mbar if produced near sea level (e.g., upon initial sealing 212) down to about 150 mbar. Thereafter, continued ambient cooling of the sealed gas-impermeable envelopes while stacked or otherwise stored (e.g., down to an ambient temperature such as 21° C.) may cause further pressure reductions within the sealed gas-impermeable envelopes and thus finished products 100 (e.g., down to about 20 mbar or the like).

Figure 5:
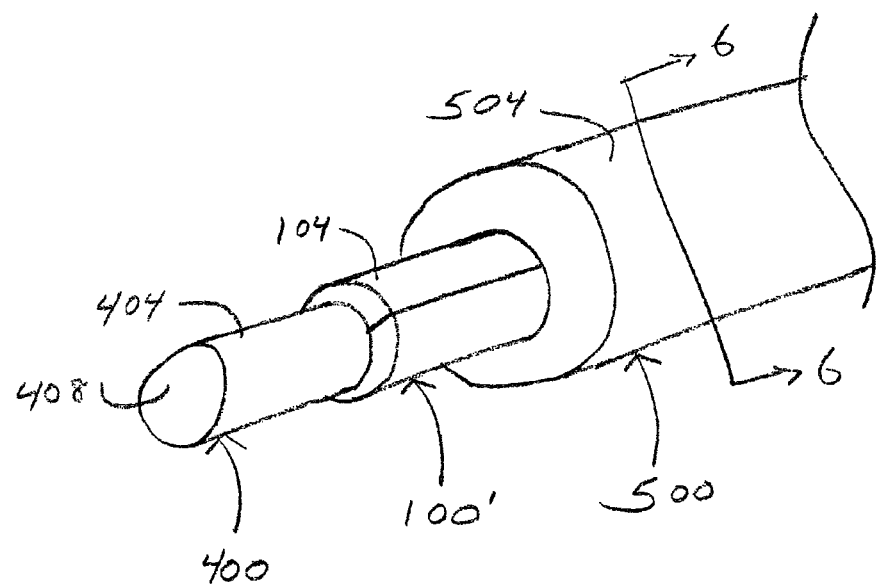
FIG. 5 is a perspective view of the thermal insulation product of FIG. 1 disposed about a non-planar outer surface.
Figure 6:
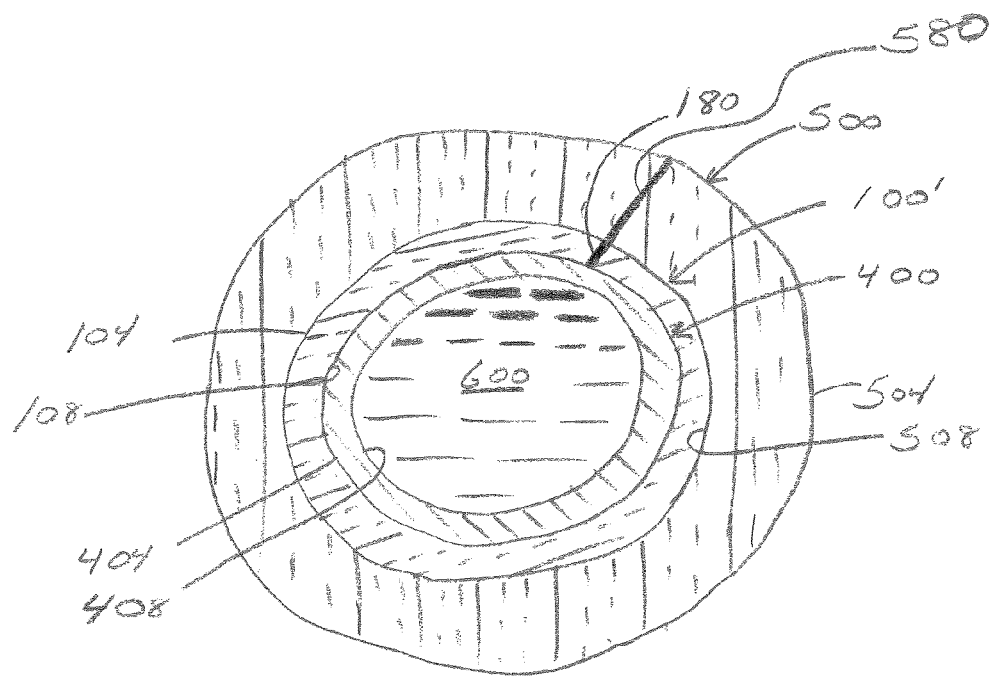
FIG. 6 is a cross-sectional view through the line 6-6 of FIG. 5.

As discussed previously, the thermal insulation products 100 disclosed herein may be manufactured and/or configured for use with non-planar or curved surfaces (e.g., pipes, storage tanks, etc.) in manners that provide numerous advantages and efficiencies over existing insulation products. Turning now to FIGS. 5-6, respective perspective and sectional views of a product 100' being disposed (e.g., wrapped, placed, etc.) about an outer non-planar surface 404 of a pipe 400 are presented (the prime (') designation being used to signify that the product 100' is in the low pressure state of FIG. 2b). More specifically, the second side 108 (e.g., inner surface) of the product 100' may be disposed against (e.g., directly, or at least abutting/adjacent) the outer surface 404 of the pipe 400 to provide resistance against heat flow into or out of a fluid 600 (e.g., hot or cold water, hot or cold refrigerant, ammonia, cryogenic, etc.) flowing or contained within the pipe 400

(e.g., where the fluid 600 is at a temperature below the boiling point of the liquid within the product 100'). In one arrangement, the fluid 600 may be at cryogenic temperatures. In another arrangement, the fluid 600 may be below the freezing point of water, such as between about −50° C. and 0° C. In a further arrangement, the fluid 600 may be at or above a substantially ambient temperature, such as at least about 50° C., or at least about 100° C., or at least about 200° C.

For instance, the product 100' may be slid onto an end of the pipe 400 and then along the outer surface 404. Alternatively, the ends of the product 100' (e.g., near seam 180 in FIG. 6) may be initially separated to allow the second side 108 of the product 100' to be fit about the outer surface 404 of the pipe 400 and then the ends may again be brought together. In one arrangement, any appropriate adhesive or the like may be used to secure the second side 108 of the product 100' to the outer surface 404 of the pipe and/or to secure the ends of the product 100' together at a seam 180. In another arrangement, more than one product 100' may be used to cover the outer non-planar surface 404 of the pipe 400 (or other non-planar surface). For instance, first and second products 100' may be used, where each of the first and second products 100' covers about half of the outer non-planar surface 404 of the pipe 400.

In a further arrangement, the product 100' may be used in conjunction with one or more additional thermal insulation products such as a second thermal insulation product 500 (e.g., fiberglass insulation, elastomeric foam, etc., where the second insulation product 500 is also configured to be disposed in a non-planar/cylindrical shape) to provide ease of installation of the product 100', protection of the product 100', increased thermal performance (e.g., decreased heat flow into or out of the pipe 400), and/or the like. For instance, the product 100' may be disposed about the outer surface 404 of the pipe 400 and then the second insulation product 500 may be disposed about the first side 104 of the product 100'. Alternatively, the first side 104 (e.g., outer surface) of the product 100' may be initially disposed against an inner surface 508 of the second insulation product (and/or secured thereto via adhesives or the like).

Thereafter, the thermal insulation product 100' and the second thermal insulation product 500 may then be collectively disposed about the outer surface 404 of the pipe 400. For instance, the products 100', 500 may be slid onto an end of the pipe 400 and then along the outer surface 404. Alternatively, the ends of the products 100', 500 (e.g., near seams 180, 580 in FIG. 6) may be initially separated to allow the second side 108 of the product 100' to be fit about the outer surface 404 of the pipe 400 and then the ends may again be brought together. In one arrangement, a thickness between the outer and inner surface 504, 508 of the second thermal insulation product 500 may be at least about 10 mm, such as at least about 40 mm, or at least about 70 mm. In another arrangement, the thickness of the second thermal insulation product 500 may be not greater than about 150 mm, such as not greater than about 120 mm, or not greater than about 70 mm. In one specific arrangement in which the pipe 400 has an outer diameter of about 25 mm, the thickness of the product 100' may be between about 3 mm to 13 mm while that of the second thermal insulation product may be between about 6 mm to 75 mm.

In addition to reduced heat gain/loss with respect to the fluid 600 contained within the pipe 400, the thermal insulation product 100' also provides increased levels of water vapor protection. In one variation, the gas-impermeable envelope 120 may be constructed of any appropriate metalized plastic film or barrier (e.g., such as for hot side temperatures near ambient temperature). In another arrangement, the gas-impermeable envelope 120 may be constructed of stainless steel (e.g., such as for hot side temperatures over about 50° C., such as up to at least 400° C.).

As discussed previously, the product 100' may be formed into an appropriate non-planar shape (e.g., such as that illustrated in FIG. 6) at the time of manufacture of the product 100'. In another arrangement, however, the product 100' may be conformed about a non-planar surface (e.g., the outer surface 404 of the pipe 400) or otherwise formed into a non-planar shape sometime after the product was initially manufactured, such as during the time of application of the product 100' about the non-planar surface or at the location of the non-planar surface (i.e., at a location different from where the product 100' was manufactured, such as where the pipe is manufactured, or where the pipe is already installed). For instance, in the event that the product 100' is relatively thin, such as a thickness between the first and second sides 104, 108 not greater than about 5 mm (e.g., such as not greater than about 3 mm), the product 100' may be conformed about a non-planar surface (or into a desired non-planar shape) such as via hand or any appropriate machinery.

Figure 7:
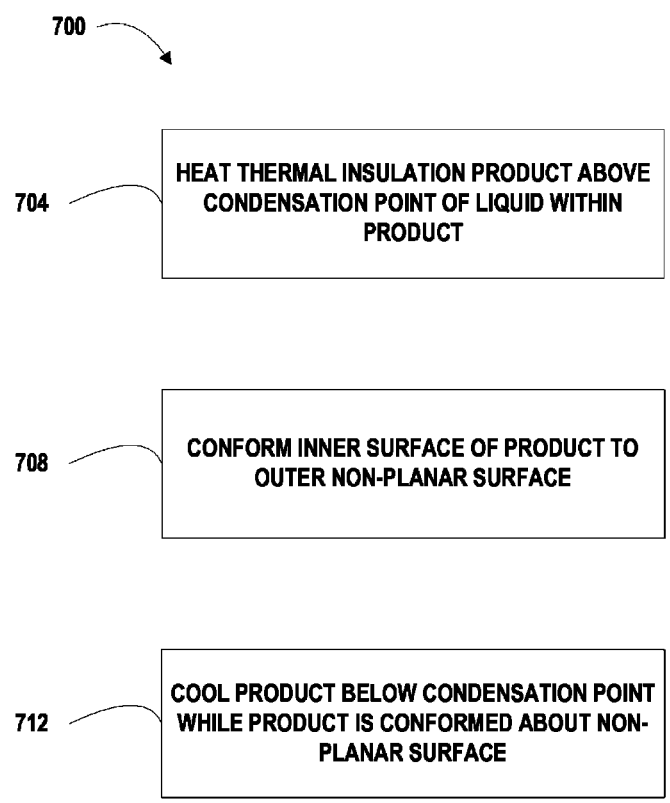
FIG. 7 is a flow diagram illustrating a method of applying the product of FIG. 1 about a non-planar surface.

As another example, and turning now to FIG. 7, one method 700 of applying a thermal insulation product (e.g., thermal insulation product 100') about a non-planar surface is disclosed. At 704, the method 700 may include heating the thermal insulation product above a boiling point of liquid within the product. For instance, the heating step 704 may cause at least some of the liquid within the product 100' (e.g., represented by the dashed lines in the bottom of the product 100' in FIG. 2b) to evaporate into a gaseous state (e.g., as shown in FIG. 2a) so as to render the product 100' at least partially pliable or conformable (e.g., so as to render the product 100' of FIG. 2b similar to the product 100 of FIG. 2a). Before the heating step 704, the product 100' may be substantially planar (e.g., as in FIG. 2b) or non-planar (e.g., such as in a concave or other shape), and may be at a substantially evacuated pressures (e.g., not greater than about 20 mbar at a temperature of about 20° C.).

After the heating step 704, the method 700 may include conforming 708 (e.g., wrapping) the inner surface of the thermal insulation product (e.g., second side 108 of product 100 of FIG. 2a) to an outer non-planar surface (e.g., outer surface 404 of pipe 400). With reference to FIG. 6, for instance, a first of the ends of the product 100 (near seam 180) may be initially placed on or against the outer surface 404 of the pipe 400. Thereafter, the product 100 may be wrapped around at least a portion of the outer surface 404 of the pipe 400 such as around a majority or even a substantial entirety of the outer surface 404 whereby the second end of the product 100 may be placed adjacent the first end of the product. In one arrangement, the second side 108 (inner surface) of the product 100 may be appropriately secured to the outer surface 404 of the pipe 400 and/or the first and second ends may be secured together at seam 180. Additionally or alternatively, the product 100 may be used in conjunction with at least a second thermal insulation product 500 as discussed above. In the case where the thermal insulation product 100 is already disposed against the inner surface 508 of the second thermal insulation product 500, the heating step 704 may include heating both of the products 100', 500 and then conforming both of the products 100, 500 about the outer surface 404 of the pipe 400 (as in FIG. 6).

While the thermal insulation product is conformed to the non-planar surface (or is otherwise in a desired non-planar shape or contour), the thermal insulation product may then be appropriately cooled 712 (e.g., passively, actively) below the boiling point of the gas within the product. For instance, the cooling step 712 may cause at least some of the gas within the product 100 (e.g., represented by the small circles and dashed lines dispersed throughout the product 100 in FIG. 2a) to condense back into the liquid state (e.g., as shown in the product 100' FIG. 2b) so as to render the product 100 substantially rigid or unpliable (i.e., to rigidify the product in the non-planar shape) with the interior portion of the product being in a low-pressure or substantially evacuated state (e.g., not greater than about 20 mbar at a temperature of about 20° C.). In one arrangement, the temperature of the fluid 600 may be below the boiling point of the liquid within the product 100.

In one arrangement, the gas-impermeable envelope 120 of the thermal insulation product 100 may be appropriately constructed, treated or manipulated so as to facilitate the ability of the product 100 to be shaped into a desired non-planar shape substantially free of tearing, rupture or breakage of the product 100. For instance, any appropriate sinusoidal shape, series of indentations, or the like may be formed into one or both of the first and second sides 104, 108 (e.g., during manufacturing of the product, such as during the cooling process) to facilitate bending or shaping of the product 100. As another example, some arrangements envisioned that the thickness of the gas-impermeable envelope 120 may be higher on the one of the first or second sides 104, 108 that is to be the outside surface when the product is formed into a non-planar shape (e.g., such as first side 104 in FIG. 6).

A further advantage of the finished/resulting thermal insulation products 100 disclosed herein will now be discussed. For instance, transient thermal performance of insulation products (e.g., the ability to resist temperature equilibration between first and second sides of an insulation product) can become important for applications in which the "hot" and "cold" temperatures respectively adjacent the opposing first and second surfaces of the products are not temporally independent of each other (e.g., construction, refrigerated trucking, and/or the like). Stated differently, transient performance of an insulation product becomes important when at least one of the first and second surfaces of the insulation product experiences temperature swings relative to the other surface.

Specifically, thermal diffusivity is a measure of transient performance governing the timescale for a material to equilibrate to a change in conditions and depends upon the thermal conductivity, density and heat capacity of the material or product (where thermal diffusivity ($\alpha$) is equal to the thermal conductivity ($\lambda$) divided by the density ($\rho$) and heat capacity ($C_p$)). For instance, the characteristic time (i.e., for the temperatures on the first and second surfaces of the product to equilibrate, where characteristic time increases with the square of the insulation product thickness) for a 25 mm thick piece of Expanded Polystyrene (EPS) foam insulation is on the order of a few minutes, while that of current VIPs is on the order of an hour or two. Generally, transient thermal performance increases with increasing characteristic time.

Before accounting for any phase changing effects of materials/components in the core of an insulation product (e.g., occurring during a temperature change adjacent a first side of an insulation product relative to an opposing second side of the insulation product) on transient performance of the insulation product, current VIPs and the present thermal insulation products 100 may have comparable transient performance (e.g., both on the order of about an hour or two). However, the increased liquid (e.g., water) content of the present thermal insulation products 100 (e.g., about 4 g/l) compared to that of current VIPs (e.g., 0.5 g/l or less) may result in a greater degree of phase changing of liquid into a vapor during temperature swings adjacent one side of the products 100 and corresponding increased transient performance of the present thermal insulation products 100 relative to current VIPs.

For instance, assume that each of a current VIP and a present thermal insulation product 100 is independently used as insulation for an outside wall of a building. Assume that the building is always about 20° C. inside but swings between 5° C. outside at night (e.g., assume 12 hours at 5° C. to idealize) and 35° C. outside during the day (e.g., also assume 12 hours to idealize). In this case and without taking into account phase changing effects of the liquid in the present thermal insulation product 100 occurring during the temperature swings, about 29.6 WHr/m$^2$ (106,560 J/m$^2$) of heating and 29.6 WHr/m$^2$ (106,560 J/m$^2$) of cooling would be needed for one day for each of the current VIP and present thermal insulation product (e.g., assuming the characteristic time is much less than the 12 hour diurnal scales).

However, the phase changing of the liquid in the present thermal insulation product 100 into vapor during the temperature swings on the outside of the building serves to increase the transient performance of the product 100 by further cooling the first or second side of the product 100 during evaporation of the liquid depending upon which of the first and second sides is the "hot" side and which is the "cold" side. For instance, imagine that the first and second surfaces 104, 108 of the thermal insulation product 100 were respectively adjacent the inside and outside of the building. Further assume that the outside of the building is initially at 5° C. and that the inside is at 20° C. In this case, the relatively lower 5° C. temperature outside of the building (e.g., compared to the 20° C. temperature inside the building) may cause vapor within the product 100 to condense adjacent the second surface 108 (e.g., as shown in FIG. 2b).

However, as the second surface 108 of the product 100 heats owing to the outside of the building increasing from 5° C. to 35° C. in this example, at least some of the liquid formerly condensed adjacent the second surface 108 on the inside of the product 100 evaporates (e.g., 100 g/m$^2$) and subsequently condenses on the inside of the product 100 adjacent the first side 104 (e.g., as the inside of the building adjacent the first side 104 is now colder (20° C.) than the outside of the building adjacent the second side (35° C.)). As the condensed liquid adjacent the second surface 108 of the product 100 absorbs energy (e.g., heat) from the second surface 108 to evaporate into a vapor, the net result is a cooling effect adjacent the second surface 108 of the product 100 and a corresponding increase in transient thermal performance of the product 100 (e.g., due to the aforementioned cooling effect tending to increase the characteristic time of the product 100 or, in other words, the time to temperature equilibrium between the first and second surfaces 104, 108 of the product 100).

Once the outside begins cooling again (e.g., down to the 5° C. temperature), the above discussed process reverses whereby condensed liquid adjacent the first surface 104 of the product 100 evaporates and condenses adjacent the second surface 108 of the product 100 (e.g. due to the relatively hotter temperature (20° C.) inside the building relative to outside the building (5° C.)) resulting in a cooling effect adjacent the first surface 104 of the product 100. In the event that the time required to "pump" the fluid from the first surface 108 to the second surface 104 (and vice versa) approaches the diurnal timescales, transient thermal performance can be greatly increased in relation to current VIPs.

EXAMPLE

A thermal insulation product is manufactured by way of disposing a support material (including 90 wt. % fumed silica and 10 wt. % silicon carbide) and steam at a temperature of about 100° C. within a gas-permeable enclosure (Imperial RB1, product 39317 manufactured by Hanes Engineered Materials) at ambient pressure, sealing the sealed gas-permeable enclosure within a gas-impermeable envelope (Cryovak PFS8155 manufactured by the Sealed Air Corporation) at ambient pressure and with the steam maintained at the temperature of about 100° C., and then cooling the gas-impermeable envelope (including the steam thereinside) for about 5 min down to a temperature of about 35° C.

After the temperature inside the gas-impermeable envelope drops down to about 20° C., the pressure within the resulting thermal insulation product is about 8 mbar.

When measured with a cold side temperature of about 5° C. and a hot side temperature of about 25° C., the thermal conductivity of the thermal insulation product is about 0.004 W/mK.

The bulk density of the thermal insulation product is about 140 g/l.

It is to be understood that the embodiments described above are for exemplary purposes only and are not intended to limit the scope of the present invention. Various adaptations, modifications and extensions of the described method will be apparent to those skilled in the art and are intended to be within the scope of the invention as defined by the claims that follow.

What is claimed is:

1. A method of applying a thermal insulation product about a non-planar surface, comprising:
   heating a thermal insulation product to a temperature that is above a boiling point of a liquid disposed within a sealed interior portion of a gas-impermeable envelope of the thermal insulation product, wherein the gas-impermeable envelope comprises inner and outer opposing surfaces;
   conforming a contour of the inner surface of the gas-impermeable envelope to a contour of a non-planar surface; and
   cooling, while the contour of the inner surface of the gas-impermeable envelope is conformed to the contour of the non-planar surface, the thermal insulation product down to a temperature that is below the boiling point of the liquid disposed within the sealed interior portion of the gas-impermeable envelope of the thermal insulation product.

2. The method of claim 1, wherein the pressure within the interior portion of the gas-impermeable envelope is not greater than about 500 mbar at a temperature of at least about 20° C. after the cooling step.

3. The method of claim 1, wherein the pressure within the interior portion of the gas-impermeable envelope is not greater than about 500 mbar at a temperature of at least about 20° C. before the heating step.

4. The method of claim 1, wherein the contour of the inner surface of the gas-impermeable envelope is substantially planar before the heating step.

5. The method of claim 1, wherein the contour of the inner surface of the gas-impermeable envelope is non-planar before the heating step.

6. The method of claim 1, wherein the cooling step comprises cooling the thermal insulation product down to a substantially ambient temperature.

7. The method of claim 1, wherein the non-planar surface comprises the outside surface of cylindrically-shaped member.

8. The method of claim 7, wherein a fluid is disposed within the cylindrically-shaped member, and wherein the fluid comprises a temperature that is less than the boiling point of the liquid.

9. The method of claim 8, wherein the fluid temperature is above a substantially ambient temperature.

10. The method of claim 8, wherein the fluid temperature is at least about 40° C.

11. The method of claim 8, wherein the fluid temperature is at least about 100° C.

12. The method of claim 7, wherein the conforming step comprises wrapping the thermal insulation product about a majority of a circumference of the outside surface of cylindrically-shaped member.

13. The method of claim 7, wherein the conforming step comprises wrapping the thermal insulation product about a substantial entirety of a circumference of the outside surface of cylindrically-shaped member.

14. The method of claim 1, further comprising:
   securing the thermal insulation product to the non-planar surface.

15. The method of claim 14, wherein the securing step comprises:
   adhering the thermal insulation product to the non-planar surface.

16. The method of claim 1, wherein the liquid comprises at least one component selected from the group consisting of water, paraffins, chlorohydrocarbons, chlorofluorocarbons, and oxygenated organics.

17. The method of claim 1, wherein the liquid comprises water.

18. The method of claim 17, wherein the cooling step comprises cooling from a first temperature that is above about 100° C. to a second temperature that is below about 100° C.

19. The method of claim 1, wherein a support material is present within the interior portion of the gas-impermeable envelope.

20. The method of claim 19, wherein the support material comprises a particulate blend.

21. The method of claim 20, wherein the particulate blend comprises a fine powder.

22. The method of claim 19, wherein the thermal insulation product further comprises a gas-permeable enclosure, wherein the support material is disposed within the gas-permeable enclosure.

23. The method of claim 22, wherein the gas-permeable enclosure is disposed between the support material and the gas-impermeable envelope.

24. The method of claim 1, wherein the thermal insulation product comprises a first thermal insulation product, and wherein the method further comprises:
   wrapping a second thermal insulation product around the outer surface of the first thermal insulation product.

25. The method of claim 24, wherein the second thermal insulation product comprises an elastomeric foam.

26. The method of claim 1, wherein the heating occurs at a location that is near the non-planar surface.

27. The method of claim 26, wherein the heating location is in a building in common with the non-planar surface.

* * * * *